US011334041B2

(12) United States Patent
Abraham et al.

(10) Patent No.: US 11,334,041 B2
(45) Date of Patent: May 17, 2022

(54) METHOD OF IDENTIFYING A LIGHTING FIXTURE

(71) Applicant: Lutron Technology Company LLC, Coopersburg, PA (US)

(72) Inventors: Arya Abraham, Bethlehem, PA (US); Nicholas J. Braskey, Pottstown, PA (US); Brian M. Courtney, Bethlehem, PA (US); William H. Howe, Pennsburg, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/181,777

(22) Filed: Feb. 22, 2021

(65) Prior Publication Data
US 2021/0176846 A1 Jun. 10, 2021

Related U.S. Application Data

(63) Continuation of application No. 16/708,195, filed on Dec. 9, 2019, now Pat. No. 10,932,346, which is a continuation of application No. 15/685,750, filed on Aug. 24, 2017, now Pat. No. 10,506,688.

(60) Provisional application No. 62/378,998, filed on Aug. 24, 2016.

(51) Int. Cl.
*H05B 45/10* (2020.01)
*H05B 47/175* (2020.01)
(Continued)

(52) U.S. Cl.
CPC .......... *G05B 15/02* (2013.01); *F21V 23/0435* (2013.01); *G05B 11/28* (2013.01);
(Continued)

(58) Field of Classification Search
CPC ........ H05B 45/10; H05B 45/20; H05B 45/40; H05B 45/325; H05B 45/327; H05B 47/10;
(Continued)

(56) References Cited

U.S. PATENT DOCUMENTS 5,399,940 A 3/1995 Hanna et al.
7,391,297 B2 6/2008 Cash et al.
(Continued)

*Primary Examiner* — Haissa Philogene
(74) *Attorney, Agent, or Firm* — Michael Czarnecki; Philip Smith; Glen Farbanish

(57) ABSTRACT

Control-source devices may be associated with control-target devices of a load control system during a configuration procedure, such that the control-target devices are responsive to the associated control-source devices during normal operation. The configuration procedure may be executed using a network device having a visual display for associating the control-source devices and control-target devices. The control-source devices may be associated with the control-target devices on an area-by-area basis using an area configuration procedure. The control-target devices may be configured to flash a controlled lighting load according to a flashing profile during the configuration procedure. The flashing profile may be characterized by at least one abrupt transition between off and on, and at least one gradual transition between off and on, where the abrupt and gradual transitions are repeated on a periodic basis.

20 Claims, 21 Drawing Sheets

(51) Int. Cl.
*G05B 15/02* (2006.01)
*H04L 12/28* (2006.01)
*F21V 23/04* (2006.01)
*G05B 11/28* (2006.01)
*H05B 47/19* (2020.01)

(52) U.S. Cl.
CPC ........ *H04L 12/282* (2013.01); *H04L 12/2809* (2013.01); *H05B 47/175* (2020.01); *H05B 47/19* (2020.01); *G05B 2219/2642* (2013.01)

(58) Field of Classification Search
CPC ...... H05B 47/11; H05B 47/105; H05B 47/19; H05B 47/175; G05B 15/02; G05B 11/28; G05B 2219/2642; H04L 12/2809; H04L 12/282; F21V 23/0435
See application file for complete search history.

(56) References Cited

U.S. PATENT DOCUMENTS

| | | | |
|---|---|---|---|
| 7,845,823 B2 | 12/2010 | Mueller et al. | |
| 8,009,042 B2 | 8/2011 | Steiner et al. | |
| 8,033,686 B2 | 10/2011 | Recker et al. | |
| 8,279,138 B1 | 10/2012 | Margulis | |
| 8,433,452 B2 | 4/2013 | Fleck et al. | |
| 8,536,984 B2 | 9/2013 | Benetz et al. | |
| 8,879,735 B2 | 11/2014 | Lord | |
| 9,113,521 B2 | 8/2015 | Gredler et al. | |
| 9,295,112 B2 | 3/2016 | Knapp | |
| 9,386,666 B2 | 7/2016 | Economy | |
| 9,392,675 B2 | 7/2016 | Taipale et al. | |
| 9,392,676 B2 | 7/2016 | Taipale et al. | |
| 9,430,044 B2 | 8/2016 | Jain et al. | |
| 9,538,603 B2 | 1/2017 | Shearer et al. | |
| 9,585,226 B2 | 2/2017 | Gajurel et al. | |
| 10,027,127 B2 | 7/2018 | Crafts et al. | |
| 10,098,074 B2 | 10/2018 | Baker et al. | |
| 10,159,132 B2 | 12/2018 | Woytowitz | |
| 10,271,407 B2 | 4/2019 | Pessina et al. | |
| 10,506,688 B2 | 12/2019 | Abraham et al. | |
| 10,932,346 B2 | 2/2021 | Abraham et al. | |
| 2009/0021955 A1* | 1/2009 | Kuang | H05B 47/11 362/479 |
| 2014/0265863 A1 | 9/2014 | Gajurel et al. | |
| 2017/0038787 A1* | 2/2017 | Baker | H04B 17/318 |
| 2017/0041886 A1 | 2/2017 | Baker et al. | |
| 2017/0123390 A1 | 5/2017 | Barco et al. | |
| 2019/0141818 A1 | 5/2019 | Pearson et al. | |

* cited by examiner

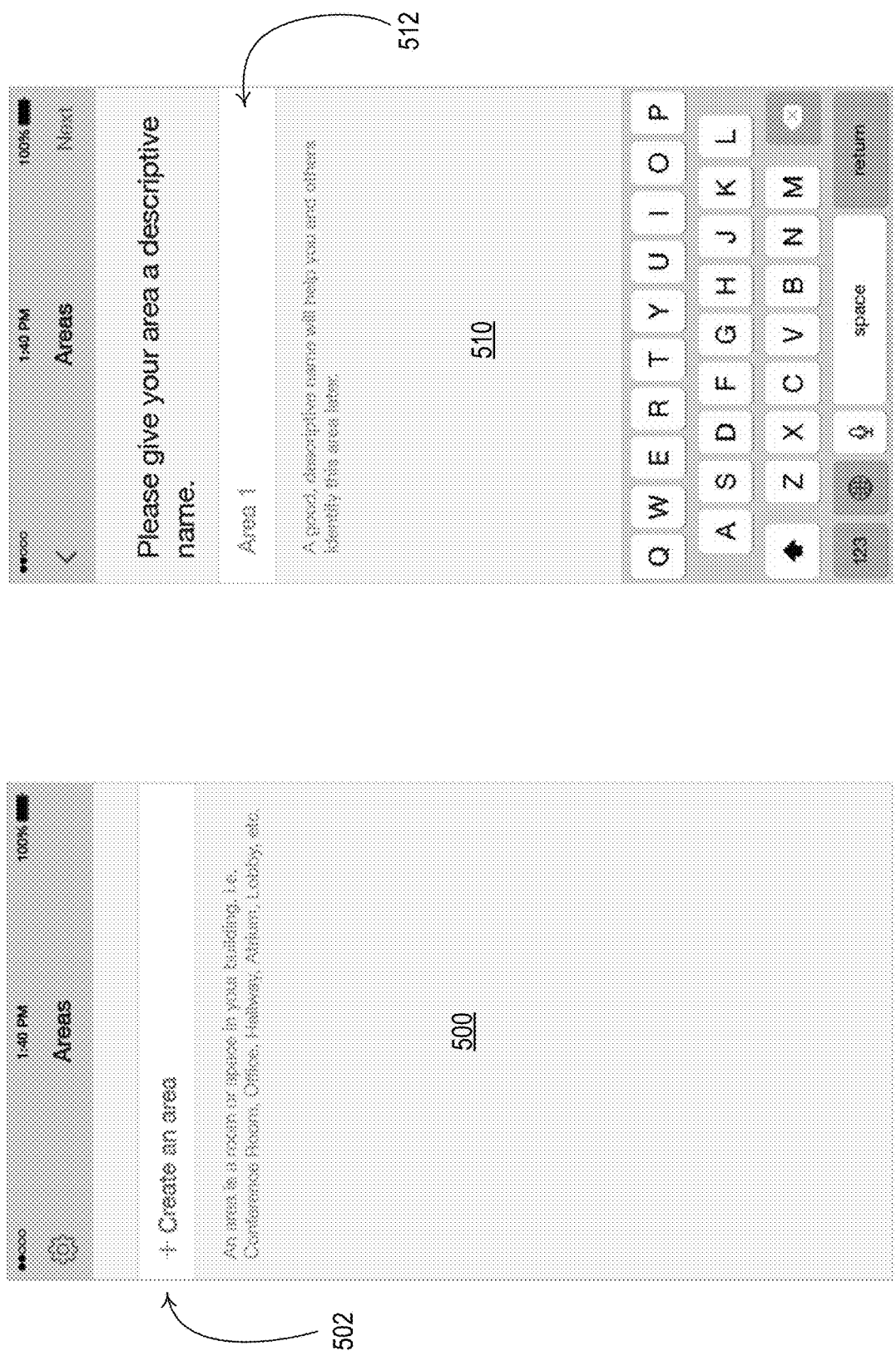

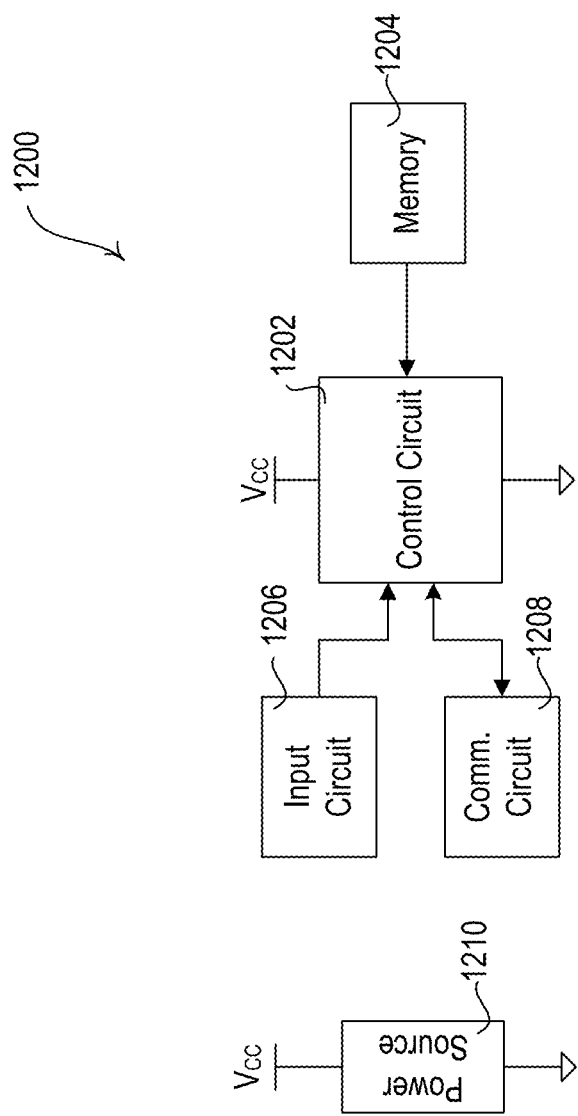

METHOD OF IDENTIFYING A LIGHTING FIXTURE

CROSS REFERENCE TO RELATED APPLICATIONS

This application is a continuation of U.S. Non-provisional patent application Ser. No. 16/708,195, filed on Dec. 9, 2019, which is a continuation of U.S. Non-provisional patent application Ser. No. 15/685,750, filed Aug. 24, 2017 (now U.S. Pat. No. 10,506,688, issued Dec. 10, 2019), which claims the benefit of U.S. Provisional Patent Application No. 62/378,998, filed Aug. 24, 2016, each of which is hereby incorporated by reference herein in its entirety.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and air-conditioning (HVAC) system may be used to control the temperature in the user environment.

Each load control system may include various control devices, including control-source devices and control-target devices. The control-target devices may receive digital messages, which may include load control instructions, for controlling an electrical load from one or more of the control-source devices. The control-target devices may be capable of directly controlling an electrical load. The control-source devices may be capable of indirectly controlling the electrical load via the control-target device.

Examples of control-target devices may include lighting control devices (e.g., a dimmer switch, an electronic switch, a ballast, or a light-emitting diode (LED) driver), a motorized window treatment, a temperature control device (e.g., a thermostat), a plug-in load control device, and/or the like. Examples of control-source devices may include remote control devices, occupancy sensors, daylight sensors, temperature sensors, and/or the like.

To enable a control-target device to recognize instructions received from a control-source device, the control-target device and the control-source device may be associated with one another, such that the control-target device may recognize the digital messages received from the control-source device. The control-target device and the control-source device may be associated with a location to enable control of electrical loads within the location.

FIG. 1 depicts a prior art user environment in which control-source devices and control-target devices may be associated. As shown in FIG. 1, a user environment may include rooms 102, 104, and 106. Each of the rooms 102, 104, and 106 may include control-target devices that may be capable of directly controlling an electrical load. For example, rooms 102, 104, and 106 may include lighting control devices 116, 136, and 146 (e.g., ballasts, LED drivers, or dimmer switches) capable of directly controlling an amount of power provided to lighting loads 118, 140, and 150, respectively. Room 102 may include additional control-target devices, such as a motorized window treatment 120 for directly controlling the covering material 122 (e.g., via an electrical motor), a plug-in load control device 130 for directly controlling a plug-in electrical load (e.g., lamp 132 plugged into the device 130), and a temperature control device (e.g., thermostat 134) for directly controlling an HVAC system.

Rooms 102, 104, and 106 may also include control-source devices capable of indirectly controlling an electrical load by transmitting digital messages, which may include load control instructions, to a control-target device. The control-source devices in rooms 102, 104, and 106 may include remote control devices 124, 142, and 152 that may be mounted to the wall and that may send digital messages to the lighting control devices 116, 136, and 146, respectively. The lighting control devices 116, 136, and 146 may control an amount of power provided to the lighting loads 118, 140, and 150, respectively, based on the digital messages received from the remote control devices 124, 142, and 152. Room 102 may include additional control-source devices, such as an occupancy sensor 110 and a daylight sensor 108. The occupancy sensor 110 may send digital messages to a control-target device based on the detection of movement or occupancy within its observable area. The daylight sensor 108 may send digital messages to a control-target device based on the detection of natural light within its observable area.

As indicated above, each of the control-target devices may have to be associated with one or more control-source devices prior to being able to receive digital messages, which may include load control instructions, from the control-source devices for controlling a corresponding electrical load. The control-source devices and the control-target devices may be associated using a push-button association method 200, which is illustrated in the block diagram in FIG. 2A. As shown in FIG. 2A, the association method 200 may begin at 202 and a user 128 (shown in FIG. 1) may actuate a button on a control-target device at 204 to cause the control-target device to enter an association mode. For example, user 128 may actuate buttons 112, 138, and 148 on lighting control devices 116, 136, and 146, respectively, to put the lighting control devices 116, 136, and 146 into association mode. Once the control-target device is in association mode, a button may be actuated on a control-source device at 206 for associating the control-source device with the control-target device. For example, user 128 may actuate button 126 on remote control device 124 to associate the remote control device 124 with the lighting control device 116. The user 128 may actuate button 116 on occupancy sensor 110 and button 114 on daylight sensor 108 to also associate each device with the lighting control device 116. Buttons 144 and 154 may be actuated on remote control devices 142 and 152 to associate the remote control devices 142 and 152 with lighting control devices 136 and 146, respectively. The user 128 may also actuate a button on the plug-in load control device 130 or the temperature control device (e.g., thermostat 134) to associate these control-target devices with a control-source device. After the control-source device is associated with the control-target device at 206, the control-target device may recognize digital messages, which may include load control instructions, from a control-source device and the user 128 may use the control-source device for instructing an associated control-target device to control an amount of power provided to an electrical load at 208. The association method 200 may end at 210.

FIG. 2B shows another prior art association method 220 for associating control-source devices and control-target devices. As shown in FIG. 2B, the association method 220 may start at 222. At 224, each of the control-source devices and control-target devices in the load control system may be identified by user 128. The user 128 may enter a location identifier for a location of a control-source device and/or a control-target device at a computer, such as computer 158 (shown in FIG. 1), at 226. The user 128 may enter each association between a control-source device and a control-target device into a computer, such as computer 158 (shown in FIG. 1), at 228. At 230, each of the control-target devices may be programmed by the user 128, via computer 158, to be capable of recognizing digital messages, which may include load control instructions, from associated control-source devices at an identified location. For example, the computer 158 may send the location identifier for the location of a control-source device to the control-target devices, so that the control-target devices may identify digital messages from the control-source devices in the location. The computer 158 may send a serial number of an associated control-source device to the control-target device so that the control-target device may identify digital messages from the control-source device. The computer 158 may program the control-target device via a load control device controller 156, for example. Once the control-target device is programmed at 230, the control-target device may recognize digital messages from a control-source device at the identified location and the user 128 may use the control-source device for instructing an associated control-target devices at an identified location to control an amount of power provided to an electrical load at 232. The association method 220 may end at 234.

The association methods 200 and 220 require knowledge of each of the devices being associated in a system. The association methods 200 and 220 also require physically actuating buttons on each control-source and/or control-target devices and/or knowledge of the location of each of the devices being associated in the system. Identifying the location of each of the devices in a system may be particularly difficult, as the devices may be installed in a location prior to assigning a communication address for communicating load control instructions to the devices. Such difficulties may cause the users to spend a lot of time searching for particular devices to be configured and, once the devices have been found, performing lengthy configuration methods to enable the devices to control electrical loads in a location. Accordingly, current association methods may be time consuming and inconvenient.

SUMMARY

A load control system may include control devices for controlling an amount of power provided to an electrical load. The control devices may include a control-source device and/or a control-target device. The control-target device may be capable of controlling the amount of power provided to the electrical load based on digital messages received from the control-source device. The digital messages may include load control instructions or another indication that causes the control-target device to determine load control instructions for controlling an electrical load. The load control system may also include a system controller for monitoring the operation of the control-source devices and/or the control-target devices and transmitting digital messages including global commands (e.g., demand response commands, all-off commands, timeclock event commands, etc.) to the control-target devices and/or the control-source devices.

The control-source devices may be associated with the control-target devices during a configuration procedure, such that the control-target devices are responsive to the associated control-source devices during normal operation. The configuration procedure may be executed using a network device having a visual display for associating the control-source devices and control-target devices. The control-source devices may be associated with the control-target devices on an area-by-area basis using an area configuration procedure. For example, the area configuration procedure may be repeated for each load control area (e.g., a load control environment and/or a room) of a building. Each control-source device located in the area may be associated (e.g., individually associated) with the control-target devices that are to be responsive to the control-source device (e.g., by stepping through each control-source device in the area one-by-one). Each control-source device may be associated with all of the control-target devices in the area or less than all of the control-target devices in the area. The control-source devices may be associated with the control-target devices of an area in any order. For example, a first control-source device may be first associated with one or more control-target devices and then a second control-source device may be associated with one or more control-target devices, or vice versa.

A control device may be configured to flash a controlled lighting load according to a flashing profile during the configuration procedure. The flashing profile may be characterized by at least one abrupt transition between off and a high-end intensity, and at least one gradual transition between off and the high-end intensity, where the abrupt and gradual transitions are repeated on a periodic basis. The control device may be configured to flash the lighting load by: (1) generating a controlled intensity for the lighting load; (2) decreasing the controlled intensity from the high-end intensity to off across a first period of time; (3) after the controlled intensity has been decreased from the high-end intensity to off, maintaining the controlled intensity at the off setting for a second period of time; (4) after the second period of time, abruptly increasing the controlled intensity from the off to the high-end intensity; (5) after the controlled intensity has been increased from off to the high-end intensity, maintaining the controlled intensity at the high-end intensity for a third period of time; and (6) periodically repeating steps 2-5 (e.g., the steps of decreasing, maintaining, increasing, and maintaining).

The above advantages and features are of representative embodiments only. They are not to be considered limitations. Additional features and advantages of embodiments will become apparent in the following description, from the drawings, and from the claims.

BRIEF DESCRIPTION OF THE DRAWINGS

FIGS. 5A-5J illustrate example screenshots that may be displayed by a visual display of a network device during an area configuration procedure.

FIG. 12 is a block diagram of an example control-source device.

DETAILED DESCRIPTION

Figure 1:
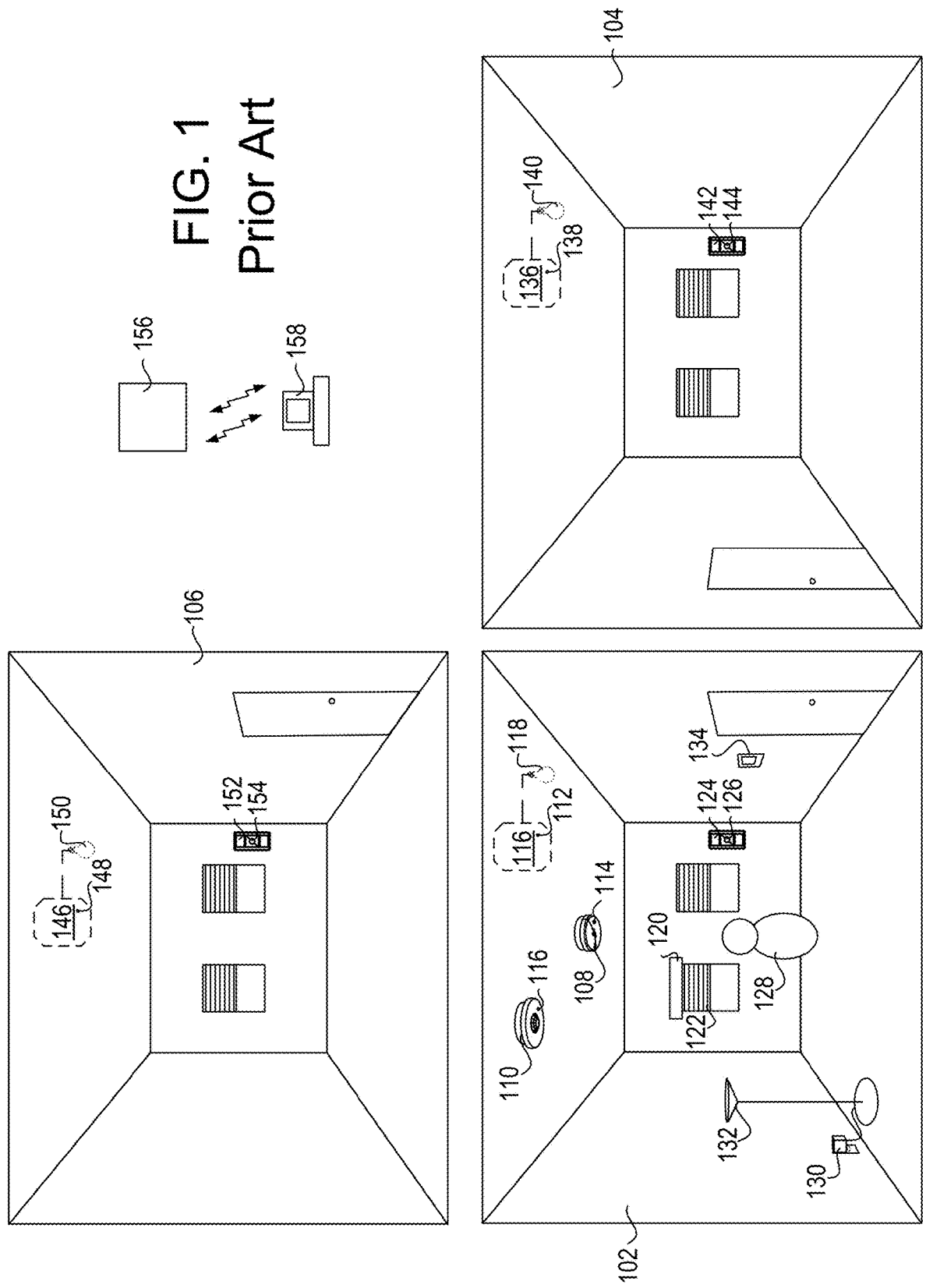
FIG. 1 is an example prior art environment for associating load control devices.
Figure 2A:
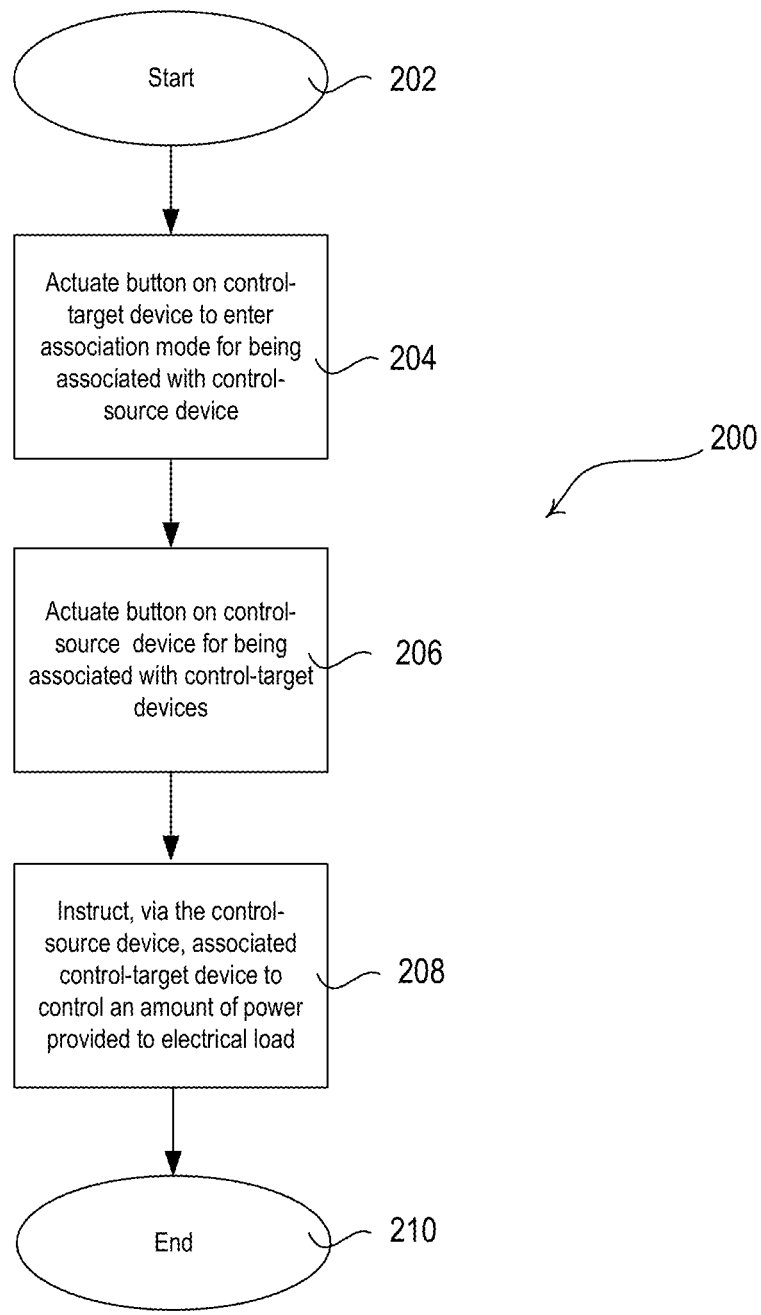
FIGS. 2A and 2B are simplified flow diagrams of example prior art processes for associating load control devices.
Figure 2B:
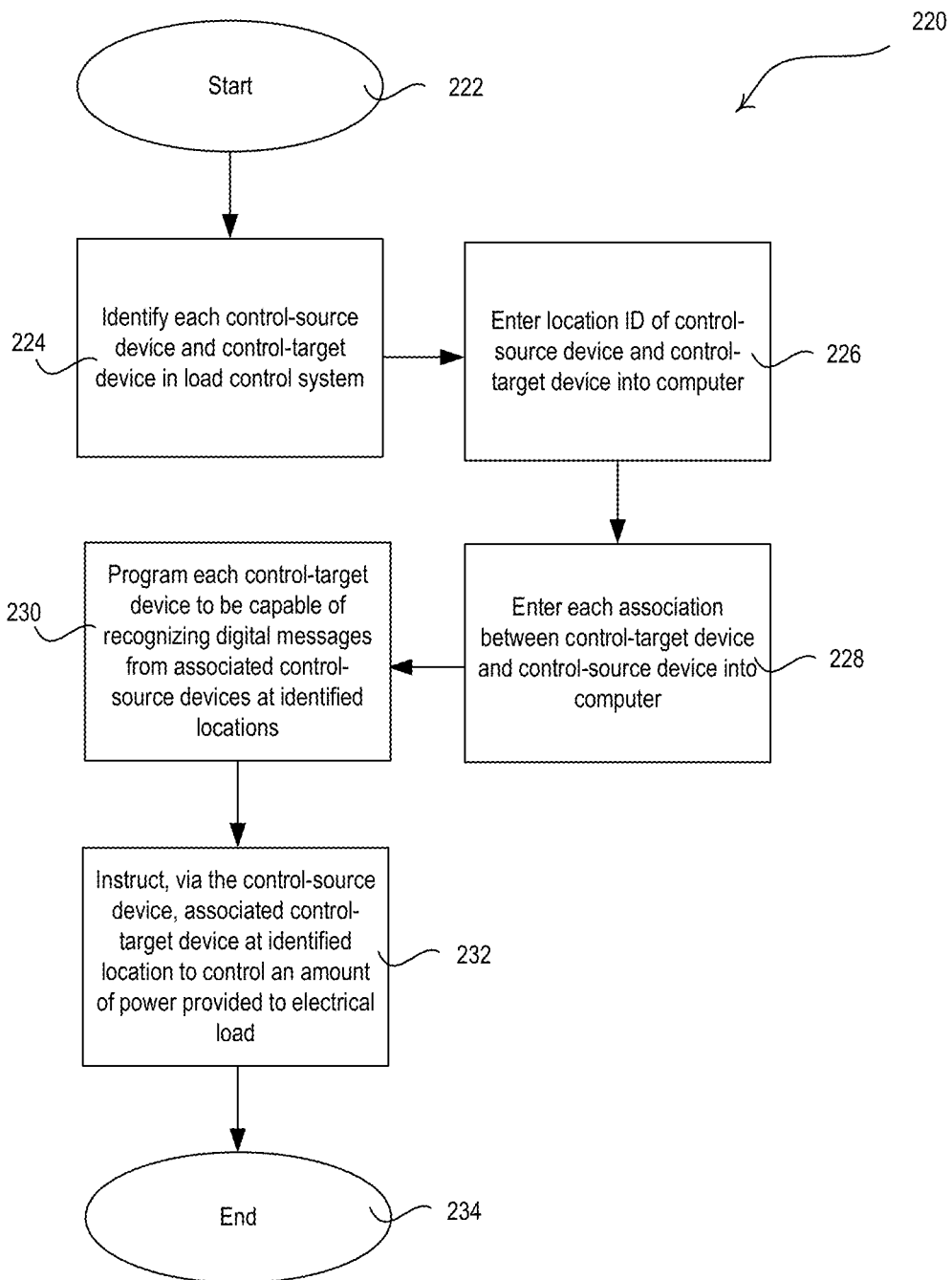
Figure 3A:
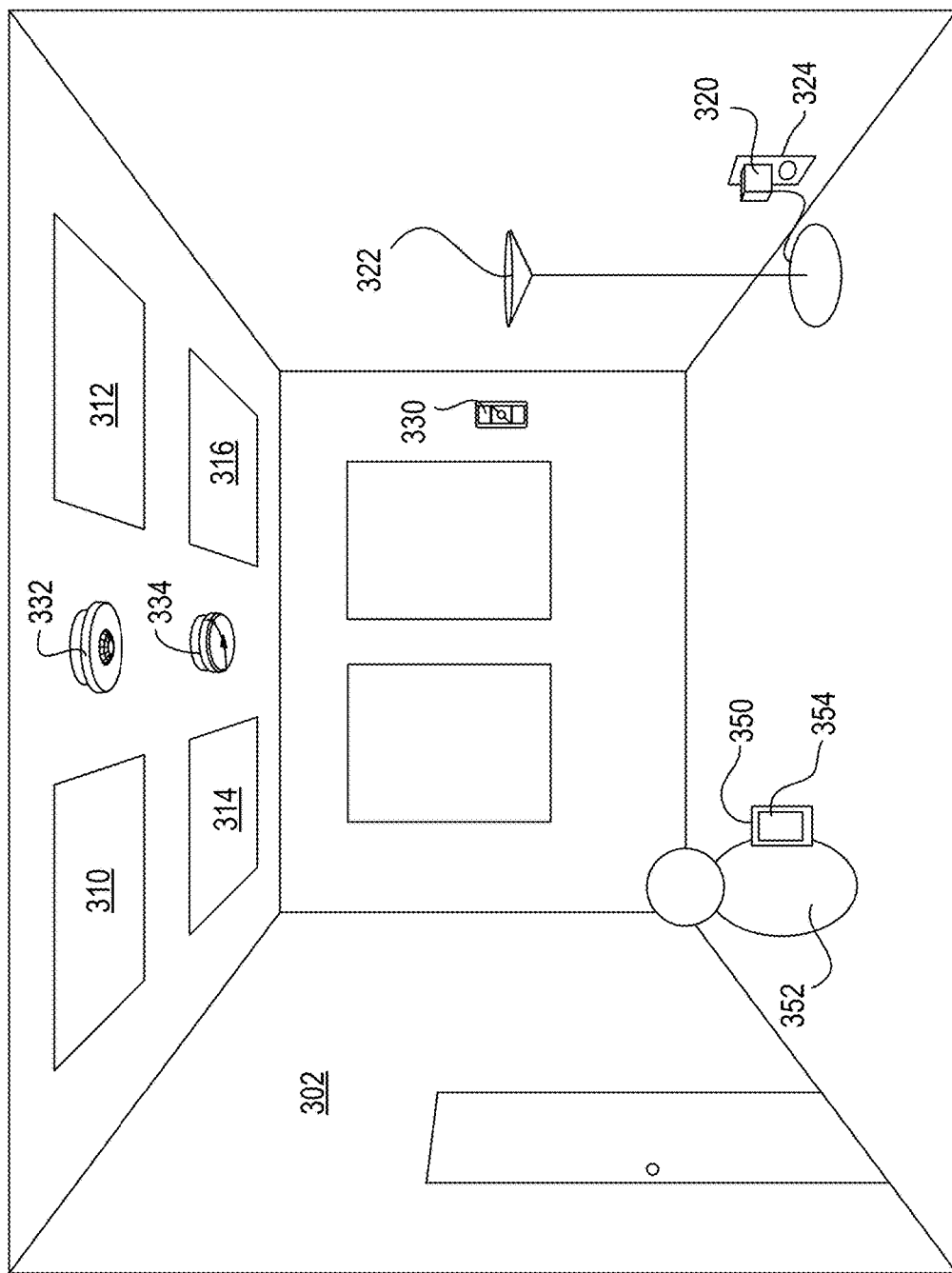
FIG. 3A is a perspective view of an example environment for associating control devices.

FIG. 3A depicts a representative load control environment 300 (e.g., a load control area) for associating control devices, which may include control-source devices and/or control-target devices. As shown in FIG. 3A, room 302 in a building may be installed with one or more control-target devices, e.g., load control devices for controlling the electrical loads within a room or building. Each load control device may be capable of directly controlling the amount of power provided to an electrical load and may be controlled by a control-source device. Example control-target devices may include lighting control devices (e.g., ballasts, LED drivers, or dimmer switches) for controlling the amount of power provided to lighting loads, a motorized window treatment having a motor drive unit (e.g., including a motor) for controlling the position of a covering material, a temperature control device (e.g., thermostat) for controlling a HVAC system, and/or a plug-in load control device for controlling a plug-in electrical load. For example, the room 302 may include a plurality of lighting fixtures 310, 312, 314, 316 that may each include a lighting load (e.g., an LED light source) and a respective lighting control device (e.g., an LED driver) for controlling the lighting load of the lighting fixture. In addition, the room 302 may include a plug-in load control device 320 for controlling a plug-in electrical load, such as a floor lamp 322, a table lamp or another electrical device that is plugged in to the plug-in load control device 320. The plug-in load control device 320 may be plugged into an electrical receptacle 324.

Control devices (e.g., a control-source device and/or a control-target device) may communicate with each other and/or other devices via a wired and/or a wireless communication link. For example, the control devices may communicate via radio frequency (RF) signals 304, which may be transmitted via any known RF communication technology and/or protocol (e.g., near field communication (NFC); BLUETOOTH®; WI-FI®); and/or a proprietary communication channel, such as CLEAR CONNECT™, etc.). A control device may be both a control-target and a control-source device.

A control-source device may be an input device that indirectly controls the amount of power provided to an electrical load by transmitting digital messages to the control-target device. The digital messages may include control instructions (e.g., load control instructions) or another indication that causes the control-target device to determine load control instructions for controlling an electrical load. Example control-source devices may include a remote control device 330, an occupancy sensor 332, and/or a daylight sensor 334. The control-source devices may include a wired or wireless device. The control-source devices may include a control device, such as a dimmer switch, an electronic switch, or the like.

Figure 3B:
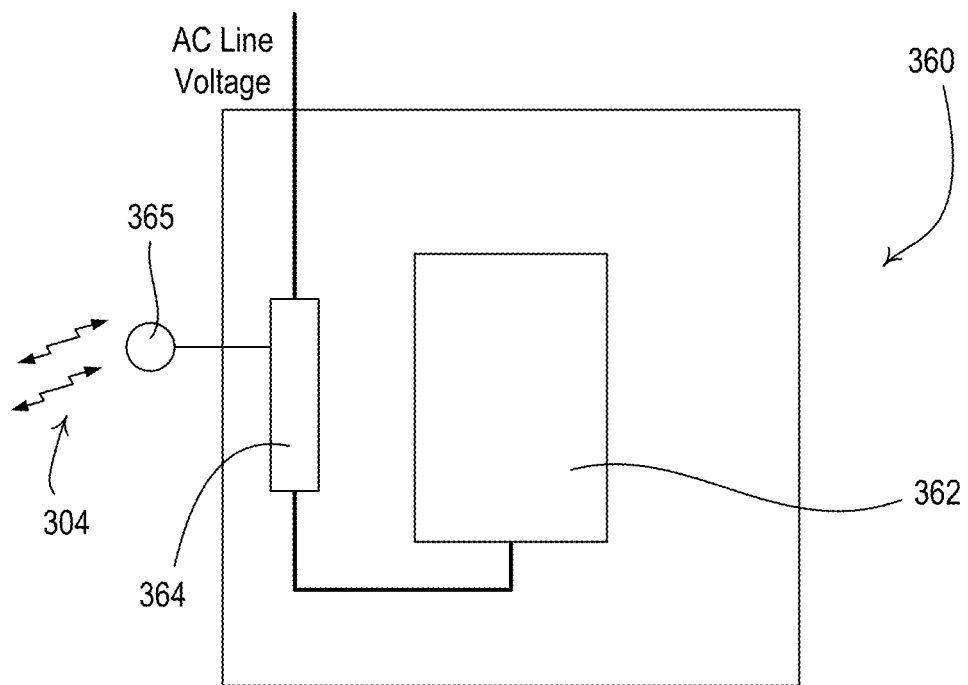
FIGS. 3B and 3C are simplified block diagrams of example lighting fixtures.

FIG. 3B is a simplified block diagram of a first example lighting fixture 360 (which may be deployed as one or more of the lighting fixtures 310, 312, 314, 316 shown in FIG. 3A). The lighting fixture 360 may include a lighting load 362 (e.g., an LED light source) and a load control device, such as a lighting control device 364 (e.g., an LED driver or a ballast). The lighting control device 364 may receive an alternating-current (AC) line voltage from an AC power source (not shown). The lighting control device 364 may include an internal load control circuit for controlling the amount of power delivered to the lighting load 362 to thus control the intensity of the lighting load 362. The lighting control device 364 may be configured to turn the lighting load 362 on and off (i.e., 0% intensity), and to adjust the intensity of the lighting load between a high-end intensity $L_{HE}$ (e.g., a maximum intensity, such as 100%) and a low-end intensity $L_{LE}$ (e.g., a minimum intensity, such as 1%-10%, and/or an intensity that is approximately 1%-10%). The lighting control device 364 may be configured to gradually (e.g., linearly) adjust the intensity of the lighting load between two intensities (e.g., at a fade rate). The lighting control device 364 may be configured to transmit and receive messages (e.g., digital messages) via a communication link (e.g., a wired or wireless communication link). For example, the lighting control device 364 may be coupled to a communication module 365, which may be located outside of the lighting fixture 360 and may be configured to transmit and receive wireless signals (e.g., the RF signals 304 shown in FIG. 3A). In addition, the lighting control device 364 may be configured to transmit and receive the RF signals 304 directly. The lighting control device 364 may be configured to operate as a control-target device to control the intensity of the lighting load 362 in response to commands in messages received via the communication link.

Figure 3C:
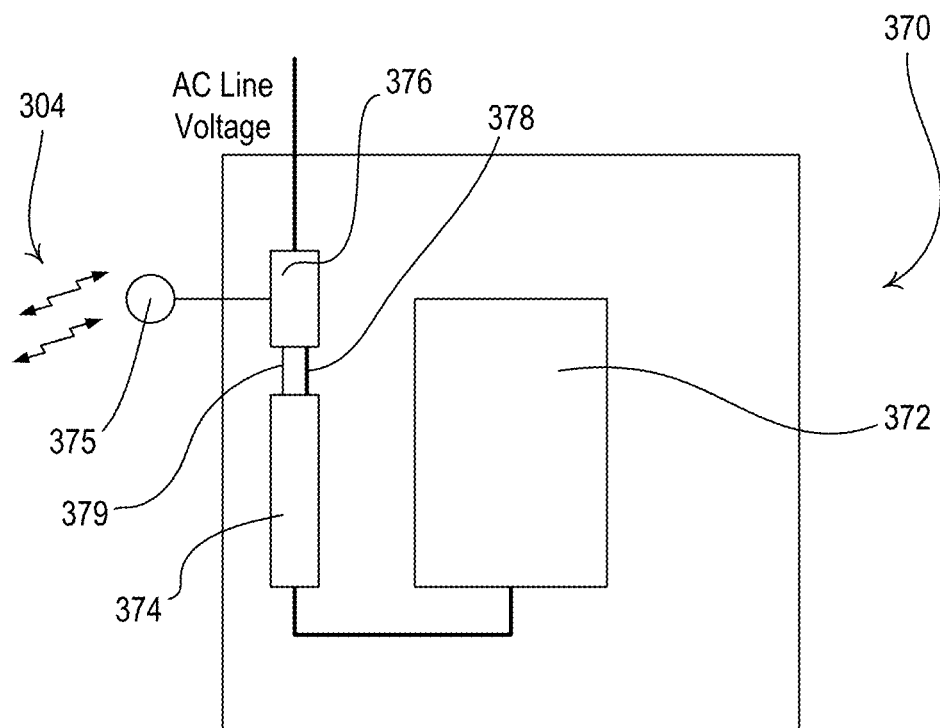

FIG. 3C is a simplified block diagram of a second example lighting fixture 370 (which also may be deployed as one or more of the lighting fixtures 310, 312, 314, 316 shown in FIG. 3A). The lighting fixture 370 may include a lighting load 372 (e.g., an LED light source), a lighting control device 374 (e.g., an LED driver or a ballast), and a control module 376. The lighting control device 374 may be configured to receive AC line voltage and provide power to the lighting load 372 via a power wiring 378. Power wiring 378 may or may not pass through control module 376. The lighting control device 374 may include an internal load control circuit for controlling the amount of power delivered to the lighting load 372 to control the intensity of the lighting load. The lighting control device 374 may be configured to turn the lighting load 372 on and off (i.e., 0% intensity), and to adjust the intensity of the lighting load between a high-end intensity $L_{HE}$ (e.g., a maximum intensity, such as 100%) and a low-end intensity $L_{LE}$ (e.g., a minimum intensity, such as 1%-10%, and/or an intensity that is approximately 1%-10%). The lighting control device 374 may be configured to gradually (e.g., linearly) adjust the intensity of the lighting load between two intensities (e.g., at a fade rate). The lighting control device 374 may not be configured to transmit and receive digital messages via the RF signals 304 (e.g., the load control device may not be configured to communicate using the protocol of the RF signals 304). Rather, the lighting control device 374 may be responsive to a control signal received via a control wiring 379 (e.g., an analog control signal, a 0-10V control signal, a pulse-width modulated (PWM) control signal, a phase-control signal, a digital message transmitted via a standard protocol, or another type of control signal).

The control module 376 may be configured to transmit and receive messages (e.g., digital messages) via a communication link (e.g., a wired or wireless communication link). For example, the control module 376 may be coupled to a communication module 375, which may be located outside of the lighting fixture 370 and may be configured to transmit and receive the RF signals 304. In addition, the control module 376 may be configured to transmit and receive the RF signals 304 directly in which case the control module 376 and the communication module 375 may be viewed as an integral (e.g., one) device. The integral control module 376 may be located outside or at least partially outside fixture 370. The control module 376 may be configured to operate as a control-target device. The control module 376 may be configured to generate the control signal provided to the lighting control device 374 via the control wiring 379 to control the intensity of the lighting load 372 in response to commands in messages received via the communication link. The control module 376 may comprise an internal load control circuit (e.g., a switching circuit, such as a relay) for controllably providing power to the lighting control device 374. An example of a lighting fixture having a control module for controlling a load control device is described in greater detail in commonly-assigned U.S. Patent Application Publication No. 2016/0028320, published Jan. 28, 2016, entitled AUTOMATIC CONFIGURATION OF A LOAD CONTROL SYSTEM, the entire disclosure of which is hereby incorporated by reference.

Referring back to FIG. 3A, the remote control device 330 may be a wireless device capable of controlling a control-target device via wireless communications. The remote control device 330 may be attached to the wall or detached from the wall. Examples of remote control devices are described in greater detail in U.S. Pat. No. 5,248,919, issued Sep. 29, 1993, entitled LIGHTING CONTROL DEVICE; issued U.S. Pat. No. 8,471,779, issued Jun. 25, 2013, entitled COMMUNICATION PROTOCOL FOR A RADIO-FREQUENCY LOAD CONTROL SYSTEM; and U.S. Patent Application Publication No. 2014/0132475, published May 15, 2014, entitled WIRELESS LOAD CONTROL DEVICE, the entire disclosures of which are hereby incorporated by reference.

The occupancy sensor 332 may be configured to detect occupancy and vacancy conditions in the load control environment 300 in which the load control system is installed. The occupancy sensor 332 may transmit digital messages to control-target devices via the RF communication signals 304 in response to detecting the occupancy or vacancy conditions. The occupancy sensor 332 may operate as a vacancy sensor, such that digital messages are transmitted in response to detecting a vacancy condition (e.g., digital messages may not be transmitted in response to detecting an occupancy condition). The occupancy sensor 332 may enter an association mode and may transmit association messages via the RF communication signals 304 in response to actuation of a button on the occupancy sensor 332. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 334 may be configured to measure a total light intensity in the load control environment 300 in which the load control system is installed. The daylight sensor 334 may transmit digital messages including the measured light intensity via the RF communication signals 304 for controlling control-target devices in response to the measured light intensity. The daylight sensor 334 may enter an association mode and may transmit association messages via the RF communication signals 304 in response to actuation of a button on the daylight sensor 334. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The load control environment 300 may include other types of control-source devices, such as, for example, temperature sensors, humidity sensors, radiometers, window sensors, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., power meters, energy meters, utility submeters, utility rate meters, etc.), central control transmitters, residential controllers, commercial controllers, industrial controllers, or any combination of input devices.

The load control environment 300 may include a system controller 340 operable to transmit and/or receive digital messages via wired and/or wireless communications. For example, the system controller 340 may be configured to transmit and/or receive the RF communication signals 304, to communicate with one or more control devices (e.g., control-source devices and/or control-target devices). The system controller 340 may be coupled to one or more wired control devices (e.g., control-source devices and/or control-target devices) via a wired digital communication link(s). The system controller 340 may be on-site at the load control environment 300 or at a remote location. Though the system controller 340 is shown as a single device, the load control environment 300 may include multiple system controllers and/or the functionality thereof may be distributed across multiple devices.

The system controller 340 may also, or alternatively, communicate via RF communication signals 306 (e.g., NFC; BLUETOOTH®; WI-FI®); cellular; and/or a proprietary communication channel, such as CLEAR CONNECT™, etc.). The system controller 340 may communicate over the Internet, or other network, using RF communication signals 306. The RF communication signals 306 may be transmitted using a different protocol and/or wireless band than the RF communication signals 304. For example, the RF communication signals 306 may be transmitted using WI-FI® or cellular signals and the RF communication signals 304 may be transmitted using another RF communication protocol, such as BLUETOOTH® or a proprietary communication protocol. The RF communication signals 306 may be transmitted using the same protocol and/or wireless band as the RF communication signals 304. For example, the RF communication signals 304 and the RF communication signals 306 may be transmitted using WI-FI® or a proprietary communication protocol.

The system controller 340 may be configured to transmit and receive digital messages between control devices. For example, the system controller 340 may transmit digital messages to the control-target devices in response to the digital messages received from the control-source devices. The digital messages may include association information for being stored at the control devices or control instructions for controlling an electrical load. The control instructions may be used to control the electrical load of a control-target device or to control the electrical load according to control configuration information. The system controller 340 may receive control instructions from a control-source device and may perform a lookup of the control-target devices associated with the control-source device. The system controller 340 may send digital messages that include control instructions to the associated control-target devices for controlling electrical loads.

Once a control-source device is associated with a control-target device, the control-source device may send digital messages to the control-target device to cause the control-target device to control an amount of power provided to an electric load. For example, the associated remote control device 330 may instruct the lighting control device of the lighting fixture 310 to increase or decrease the lighting level of the respective lighting load. The associated occupancy sensor 322 may send similar instructions to a control-target device based on the detection of movement or occupancy within the room 302. The daylight sensor 334 may send similar digital messages to a control-target device based on the detection of natural light within the room 302.

The control devices may discover and/or perform association with the system controller 340. The control devices may send association messages to the system controller 340 and/or the system controller 340 may send association messages to the control devices. An identifier of the system controller 340 may be stored at the control devices for detecting communications from the system controller 340.

The system controller 340 may include control configuration information according to which one or more control-target devices may be controlled. For example, control configuration information may include preset configurations. The system controller 340 may generate digital messages according to the preset configurations to set a dimming level of the lighting loads of the lighting fixtures 310, 312, 314, 316 to a predefined level. Different presets may be configured to control different control-target devices to control a corresponding electrical load differently. Example preset configurations may include a bedtime preset for when a user is going to bed, a movie watching preset for when a user is watching television or a movie, an away preset for when a user is away from the building, a home preset for when the user is in the building, or other preset configurations a user may define for an occasion.

The control configuration information may include zone configurations. The zone configurations may define one or more zones in which a control-target device is defined for being controlled. The zones may be a group of control devices for being associated that have a group identifier. The control-target devices in different zones may be separately controlled by sending digital messages having control instructions for controlling each zone. Different zones may be identified by a zone identifier (e.g., group identifier) that may be stored at the system controller 340 and/or the control devices in the zone. Each zone may be defined as a location having a zone identifier that is a location identifier. Though the zone may be described herein as a location having a location identifier, other zone configurations may be similarly implemented as described herein for locations.

The load control environment 300 may include a network device 350. The network device 350 may perform wired and/or wireless communications. Examples of the network device 350 may include a wireless phone, a tablet, a laptop, a personal digital assistant (PDA), a wearable device (e.g., a watch, glasses, etc.), or another computing device. The network device 350 may be a user device operated by a user 352. The network device 350 may include a visual display 354 for displaying information for the user 352 and may be configured to receive user inputs from the user. The network device 350 may communicate wirelessly by sending digital messages on RF communication signals 306 (e.g., WI-FI® signals, WI-MAX® signals, cellular signals, etc.). The network device 350 may communicate digital messages in response to a user actuation of one or more buttons on the network device 350. Examples of load control systems having WI-FI®-enabled devices, such as smart phones and tablet devices, are described in greater detail in commonly-assigned U.S. Patent Application Publication No. 2013/0030589, published Jan. 31, 2013, entitled LOAD CONTROL DEVICE HAVING INTERNET CONNECTIVITY, and U.S. patent application Ser. No. 13/796,486, filed Mar. 12, 2013, entitled NETWORK ACCESS COORDINATION OF LOAD CONTROL DEVICES, the entire disclosures of which are incorporated herein by reference.

The network device 350 may communicate with the system controller 340 using digital messages transmitted via RF communication signals 306 (e.g., WI-FI® signals, WI-MAX® signals, cellular signals, etc.) to allow the network device 350 to associate control devices (e.g., control-source devices and/or control-target devices) and/or control electrical loads. When the RF communication signals 304 and the RF communication signals 306 communicate on the same communication protocol and/or the same band, the network device 350 may operate as the system controller 340, as described herein.

The network device 350 may execute an application locally for displaying information received from the system controller 340 and/or receiving user input for communicating information to the system controller 340. The system controller 340 may be accessed from the network device 350 via a web interface (e.g., a web browser) and/or via a control application (e.g., a load control application and/or a configuration application) at the network device 350, for example. The user 352 may generate and store association information on the network device 350 for associating control-source devices and control-target devices.

The association information may be stored in the form of a table or database that associates a unique identifier (e.g., serial number) of a control-target device with a location and/or a unique identifier (e.g., serial number) of one or more control-source devices. The association information may include a device type identifier that indicates a device type of the control-target device (e.g., lighting control device, motorized window treatment, plug-in load control device, temperature control device, etc.) and/or a device type of the control-source devices (e.g., remote control device, occupancy sensor, daylight sensor, window sensor, etc.). The association information may be sent from the network device 350 to the system controller 340. The system controller 340 may store the association information. The system controller 340 may identify the association information corresponding to each control-target device by identifying the unique identifier of the control-target device and the corresponding associated devices (e.g., unique identifiers of the control-source devices) to transmit the association information to each control-target device for storage thereon. The system controller 340 may identify other information, such as control configuration information, corresponding to each control-target device and may transmit the information to each control-target device for storage thereon, such that the control-target devices may respond according to the information.

The control devices may be associated with a location for enabling control of electrical loads in the location. The control devices may also be associated with other control devices in the location for enabling the control of the electrical loads. For example, a control device may be associated with a location by storing a location identifier at the control device, such that the control device may detect digital messages sent to control devices in the identified location. The control device (e.g., control-target device) may be associated with other control devices (e.g., control-source devices) by storing an identifier of the control devices, such that the control device (e.g., control-target device) may detect digital messages sent from associated control devices (e.g., control-source devices) for controlling an electrical load. When a control-target device is associated with a control-source device, the control target device may be responsive to the control-source device.

The location of control devices may be discovered relative to the location of other control devices in the load control environment. Control devices (e.g., control-source devices and/or control-target devices) may send a message within a discovery range that may be received by other control devices within the discovery range. The message may be a dedicated discovery message that may be identified by a receiving device as a discovery message or another message that may be transmitted in the load control environment 300 and may be interpreted as a discovery message. For example, the message may be an association message for associating devices in the load control environment 300, and/or the message may be a control message for controlling devices in the load control environment 300.

A control device that sends a discovery message (e.g., dedicated discovery message or a message otherwise interpreted as a discovery message) may be identified as a load control discovery device. The load control discovery device may be a device that performs one or more activities. For example, the load control discovery device may be a control-source device (e.g., the remote control device 330) that controls the amount of power provided to an electrical load by transmitting digital messages to the control-target device and/or a control device that sends a discovery message to one or more control devices.

The load control discovery device may be a dedicated load control discovery device. For example, the dedicated load control discovery device may be a device (e.g., a control device) that may be used for sending a discovery message to control devices and/or system controller 340 during a dedicated discovery mode. The discovery message may be a message used for discovering control devices and/or system controller 340. The discovery message may be a message used for one or more activities. For example, the discovery message may be a message configured to discover control devices and/or system controller 340, and/or the discovery message may be a message configured to associate a control device with another control device and/or the system controller 340. The discovery message may be a control message configured to discover control devices and to control a control device with another control device. The dedicated discovery mode may be enabled for a period of time, may be enabled/disabled upon receipt of an indication by a user, and/or may be configured as a static mode on the dedicated discovery device.

The discovery range may correspond to a transmission power (e.g., an adjustable transmission power) of the load control discovery device. The load control discovery device may be preconfigured for a location. For example, the load control discovery device may be stored as the load control discovery device for an identified location at the system controller 340, at the load control discovery device, and/or other devices at an identified location. The discovery message sent by the load control discovery device may be received by other devices, such as other control devices and/or the system controller 340.

The other devices may receive the discovery message and determine whether the discovery message is received at a signal strength that is above a reception power threshold (e.g., a predefined signal strength). The predetermined signal strength may be received from the system controller 340 and/or may be preconfigured at the time of manufacture. The control devices that receive the discovery message may report the receipt of the discovery message. The control devices that receive the discovery message may report the received signal strength of the discovery message. The control devices may report the receipt of the discovery message and/or the received signal strength to another control device (e.g., control-source device, control-target device, etc.). The control devices that receive the discovery message may report the receipt of the discovery message and/or the received signal strength to the system controller 340. The control device and/or the system controller 340 may store the control devices that receive the discovery message and provide an identifier of the control devices to the network device 350. The network device 350 may display the control devices to the user 352 for association with a location and/or other control devices.

Devices may receive the discovery message and determine whether the discovery message is received within a discovery range and/or a discovery zone. The discovery range may be partitioned into one or more discovery zones. The discovery zones may be identified by the received signal strength at which the discovery message may be received, and/or the discovery zones may be identified by another identifier, such as the transmission power of the discovery message and/or a threshold value (e.g., the reception power threshold value). The discovery messages may be transmitted within the discovery range and may identify a discovery zone within which devices may respond. The discovery zone may be identified by a received signal strength or range of received signal strengths for which control devices may respond if the discovery message is received at the identified signal strength.

The discovery message transmitted by the load control discovery device may be a broadcast message that may be broadcast within the established discovery range. The discovery message may include information identifying the load control discovery device from which the discovery message was transmitted. The discovery message may indicate the type of control device (e.g., remote control device, occupancy sensor, lighting control device, etc.), a unique identifier (e.g., serial number) that may identify the load control discovery device, the link address for communicating with the load control discovery device directly, whether the device is a control-target device or a control-source device, and/or other information about the device.

The discovery range may be dependent upon the transmission power and/or a range of transmission powers of the transmitting device. For example, the discovery range may be based on a transmission power at which digital messages are transmitted from the load control discovery device or a distance for which the digital messages are to be transmitted. The transmission power of the transmitting device may be adjustable in order to adjust the area of the discovery range.

The discovery range may also, or alternatively, be dependent on a threshold. For example, the discovery range may be dependent on a reception power threshold of the receiving device. For example, the discovery range may be dependent upon the signal strength at which the control devices receive digital messages from the load control discovery device. The signal strength may be a signal strength indicated as a received signal strength indicator (RSSI) at each of the receiving devices. The RSSI may be defined as a measure of the power level that a receiving device is receiving digital messages from the transmitting device. The receiving devices may each compare the RSSI of a received message to the reception power threshold (which may be stored in memory in each receiving device) and may respond to the received message if the RSSI is greater than the reception power threshold. The reception power threshold of each receiving device may be adjustable in order to adjust the area of the discovery range. For example, the discovery message may include a reception power threshold to which the receiving control device may compare the RSSI of the received signal (e.g., the discovery message).

The discovery range may be partitioned into multiple discovery zones having different RSSI values and/or ranges. For example, the discovery range may be broken up into discovery zones that each correlate to different groups of devices (e.g., devices that receive the discovery message at the same signal strength and/or within the same range of signal strengths). Selecting control devices within a particular discovery zone or zones may limit the number of devices transmitting a response at the same time to reduce or preclude interference from occurring between devices located within different discovery zones. The control devices in different zones that respond to discovery messages may be aggregated by selecting control devices from more than one discovery zone. The control devices in different zones may be displayed to the user and/or provided to the control devices independently, e.g., based upon the location of the control devices in the different zones.

The transmission power of the load control discovery device may define the discovery range. The discovery range may be defined according to a minimum signal strength (e.g., minimum RSSI) to a maximum signal strength (e.g., maximum RSSI). The minimum signal strength may define the outer edge of the discovery range. The maximum signal strength may define an inner region (e.g., region inside of the discovery range), inside of which devices may not respond to the discovery message. The maximum signal strength may be set such that the inner region is small (e.g., zero feet from the load control discovery device). The transmission of the load control discovery device may begin at the inner region, e.g., the load control discovery device may begin transmission at zero feet from the load control discovery device, and incrementally transmit beyond zero feet from the load control discovery device.

Control devices within the discovery range may respond to a discovery message transmitted from the load control discovery device. Each control device may calculate the RSSIs of each respective discovery message received. One or more control devices may organize the control devices according to the RSSIs of each respective discovery message received. The system controller 340 and/or the network device 350 may organize the control devices. For example, system controller 340 and/or the network device 350 may organize the control devices according to the RSSIs of each respective discovery message received. Control devices that receive the discovery message in a signal having an RSSI above the reception power threshold may be within the discovery range, and control devices that receive the discovery message in a signal having an RSSI below the reception power threshold may be outside the discovery range.

The discovery range may be affected by interference. For example, a wall, floor, or ceiling separating rooms may cause interference. A control device receiving the discovery message within a same discovery range and/or a same discovery zone as another control device may cause interference. Interference may degrade the signal strength of a discovery message. Such degradation may reduce the discovery range of a discovery message transmitted from a load control discovery device. The discovery range may be degraded by the wall between the room 302 and adjacent rooms, as well as by the ceiling and floor between the room 302 and adjacent rooms.

The transmission of the discovery message may be triggered by actuation of a button on the load control discovery device and/or receipt of a discovery trigger message. For example, the load control discovery device may be identified as remote control device 330 and/or the load control discovery device may be identified as a dedicated load control discovery device. The user 352 may actuate a button (e.g., for a predefined period of time), a sequence of buttons, and/or perform other commands on the load control discovery device to transmit the discovery message. Actuation of a button for different periods of time may cause the load control discovery device to be set to different modes. For example, actuating a button for three seconds on load control discovery device (e.g., remote control device 330) may cause the load control discovery device to be set to an association mode, in which the load control discovery device may send an association message to a control-target device. Actuating a button for six seconds on the load control discovery device (e.g., remote control device 330), in the example, may cause the load control discovery device to be set to a discovery mode, in which the load control discovery device may send a discovery message to a control-target device. The load control discovery device may also, or alternatively, receive a discovery trigger message from the system controller 340 or the network device 350. The network device 350 may receive an actuation of a button by the user 352 and may transmit a discovery trigger message to the load control discovery device or an indication to the system controller 340 to transmit the discovery trigger message.

The transmission of the discovery message may be performed by sensors in the load control environment. For example, the load control discovery device may be an occupancy sensor that may transmit digital messages upon identification of an occupancy condition (e.g., occupied room) and/or a vacancy condition (e.g., unoccupied room). The occupancy condition and/or the vacancy condition may be interpreted by other devices as a discovery message (e.g., when the devices are in a discovery mode). A user may enter or leave a room to trigger transmission of a discovery message in a location of the occupancy sensor to discover devices in that location.

The control devices receiving the discovery message from the load control discovery device may be two-way communication devices (e.g., the lighting control devices in the lighting fixtures 310, 312, 314, 316) that may receive the discovery message and may acknowledge receipt of the discovery message to the system controller 340. The control devices may identify the discovery message as being from the load control discovery device and may store an indication of receipt of the discovery message. The control devices may identify the discovery message by a device identifier of the load control discovery device that is unassociated with the control devices, a device identifier of the load control discovery device that is associated with the control devices and identified as the load control discovery device, and/or a discovery message identifier. The control devices may store the signal strength (e.g., received signal strength indication (RSSI)) at which the discovery message is received and/or the control devices may store a threshold value (e.g., the reception power threshold value). The control devices may report the signal strength to one or more other devices, and/or the control devices may report to one or more devices whether the signal strength is below or above the reception power threshold. For example, the control devices may report the signal strength to other control devices, to network device 350, and/or to system controller 340. The control devices may also, or alternatively, report whether the signal strength is below or above the reception power threshold. The receipt of the discovery message may be reported if the signal strength (e.g., the RSSI) is above the threshold (e.g., the predefined reception power threshold).

The control devices that are one-way communication devices (e.g., the remote control device 330, the occupancy sensor 332, the daylight sensor 334, etc.) may be unable to receive the discovery message. The one-way communication devices may transmit a discovery message to the load control discovery device and/or the system controller 340 for being detected and/or associated. The discovery messages may include the identifier of the transmitting device. To transmit the discovery message, the user 352 may actuate a button on the one-way communication device. The user 352 may actuate a button on the remote control device 330, a button on the occupancy sensor 332, a button on the daylight sensor 334, and/or the like. To trigger the transmission of discovery information at the occupancy sensor 332 and/or the daylight sensor 334, the user 352 may also, or alternatively, transmit a laser signal identifiable by the occupancy sensor and/or the daylight sensor. Though some control devices may be described as two-way communication devices, any control device may include a button for transmitting a discovery message.

As the load control discovery device may receive messages from control devices, the two-way communication devices may also send a discovery message or a response to the discovery message transmitted from the load control discovery device. The load control discovery device may determine the signal strength at which the messages from the control devices are received. The load control discovery device may internally record the identified devices and/or the signal strengths. The load control discovery device may provide the identified devices and/or the signal strengths to the system controller 340 and/or the network device 350. Though certain devices may be described as one-way communication devices or two-way communication devices, the devices may be configured for either one-way or two-way communication.

The system controller 340 and/or the network device 350 may be used to coordinate the discovery and association of control devices in a location. The user 352 may actuate a button on the network device 350 to discover devices in a location and the network device may request discovery information from the system controller 340. The system controller 340 may receive the request and may transmit a digital message to put the control devices in a discovery mode. The digital message that puts the control devices in the discovery mode may be the same message as the discovery trigger message for triggering the discovery message at the load control discovery device, or may be a different message. Once in the discovery mode, the control devices may know to listen for the discovery message. The user 352 may actuate a button on a control device to enter the discovery mode. For example, the user may actuate a button or buttons (e.g., for a predefined period of time) on the load control discovery device to send a digital message to the system controller 340 and/or other control devices to enter the discovery mode.

The control devices may transmit a digital message to the system controller 340 to acknowledge receipt of the discovery message. The digital messages may include the device identifier of the load control discovery device and/or a signal strength at which the discovery message was received. The digital messages may be sent to the system controller 340 in response to a request from the system controller 340 (e.g., after the system controller receives the discovery message itself). The request from the system controller 340 may include a request to acknowledge receipt of a message from a device having the device identifier of the load control discovery device and/or the received signal strength of the message. The request from the system controller 340 may include a request to acknowledge receipt of the discovery message from the load control discovery device and/or the received signal strength of the message if the discovery message was received at a signal strength above a predefined threshold (e.g., the reception power threshold). The request from the system controller 340 may include a request for device identifiers of unassociated devices from which messages have been received (e.g., since entering the discovery mode) and/or the received signal strength of the messages. The request from the system controller 340 may include a request for device identifiers of load control discovery devices from which messages have been received (e.g., since entering the discovery mode) and/or the received signal strength of the message.

The system controller 340 may provide the discovered devices to the network device 350 for display to the user 352. The system controller 340 may organize the discovered devices for display to the user 352 for performing association. The system controller 340 may organize the discovered control devices in an organized dataset (e.g., ascending or descending list) that is organized by the signal strength at which the discovery message was received at each device. The system controller 340 may remove any devices from the dataset that receive the discovery message at a signal strength below a predefined threshold (e.g., the reception power threshold). The system controller 340 may include a predefined number of devices in the dataset that have the greatest signal strength. The system controller 340 may send the organized dataset to the network device 350 for displaying to the user 352.

Though the coordination of discovery and/or association of control devices is described herein as being performed at the system controller 340, such functionality may be implemented in the control devices themselves. One or more control devices (e.g., lighting control devices in the lighting fixtures 310, 312, 314, 316, remote control device 330, etc.) may be used to coordinate the discovery and/or association of control devices (e.g., control devices within a location). A central control device or control devices may receive the request to put the control devices in a discovery mode and may transmit a digital message to put the control devices in the discovery mode. The digital message may be sent to control devices neighboring the central control device or control devices. The digital message that puts the control devices in the discovery mode may be the same message as the discovery trigger message for triggering the discovery message at the load control discovery device, or may be a different message. Once in the discovery mode, the control devices may know to listen for the discovery message. The central control device or control devices may collect the discovery information (e.g., acknowledgement of receipt of the discovery message and/or the signal strength at which the discovery message was received) from the other control devices and may provide the discovery information to the network device 350. The central control device or control devices may receive association information from the network device 350 and send the association information, or relevant portions thereof, to the other control devices.

The network device 350 may organize the discovered devices for display to the user 352 for performing association. The network device 350 may organize the discovered control devices in an organized dataset (e.g., ascending or descending list) that is organized by the signal strength at which the discovery message was received at each device. For example, the network device 350 may first display control devices that received the discovery message with the highest RSSIs, followed in descending order by the devices that received the discovery message with lower RSSIs. The network device 350 may remove any devices from the dataset that received the discovery message at a signal strength below a predefined threshold (e.g., the reception power threshold). The network device 350 may include a predefined number of devices in the dataset that have the greatest signal strength.

The user 352 may select control devices (e.g., lighting control devices in the lighting fixtures 310, 312, 314, 316) from the discovered devices displayed on the network device 350. The selected control devices may be associated with the load control discovery device that was used to discover the control devices with the discovery range. The network device 350 may generate association information regarding the load control discovery device and the selected control devices in response to the inputs received from the user 352. The selected control devices may also be associated with a control device (e.g., a control-source device) other than the load control discovery device.

The user 352 may configure association information and/or control configuration information for discovered control devices at the network device 350. The discovered control devices may be associated with one or more location identifiers that identify locations in the load control environment 300. The locations may be identified by the user 352 (e.g., from a list of predefined locations) or may be a predefined location or locations associated with the load control discovery device (e.g., the location in which the load control discovery device is installed).

The network device 350 may access the association information stored at the system controller 340. The association information may include device identifiers of the discovered devices, location identifiers of the discovered devices, and/or identifiers of associated control devices. The user 352 may disassociate discovered control devices from previously associated control devices by making selections on the network device 350. The user 352 may associate discovered control devices with other control devices by making selections on the network device 350.

The user 352 may access the control configuration information stored at the system controller 340. The user 352 may edit currently stored control configuration information for discovered control devices by making selections on the network device 350. The user 352 may generate and store control configuration information for discovered control devices by making selections on the network device 350.

The network device 350 may transmit the association information and/or control configuration information to the system controller 340 (e.g., upon actuation of a button by the user 352). The system controller 340 may store the updated association information and/or control configuration information thereon. The system controller 340 may transmit the association information and/or control configuration information to the control devices to update the association information and/or control configuration information stored at the control devices. The system controller 340 may broadcast the updated association information and/or control configuration information to the control devices for the control devices to identify updated corresponding association information and/or control configuration information, if any, for being stored locally thereon.

A control-target device (e.g., one of the lighting control devices of the lighting fixtures 310, 312, 314, 136) may be identified as the load control discovery device. One of the lighting control devices of the lighting fixtures 301, 312, 314, 316 may be identified as the load control discovery device at the system controller 340 and/or the lighting control device itself. The load control discovery device may be predefined for a location or switched between control devices. The load control discovery device may be switched between control devices via a command from the network device 350 (e.g., a command from the network device 350 to the system controller 340). The user 352 may select the control device to be identified as the load control discovery device, and the identifier of the selected control device may be stored as the load control discovery device (e.g., at the system controller 340, the network device 350, the control device identified as the load control discovery device, and/or other control devices). One of the lighting control devices of the lighting fixtures 310, 312, 314, 316 may be identified as the load control discovery device to discover a different set of control devices than was identified by another device, such as the remote control device 330.

The organized dataset may be deleted, reorganized, and/or rebuilt after the load control discovery device is switched. For example, the organized dataset may be deleted if a load discovery device is disassociated from one or more control devices, and/or if the load control discovery device is configured in a manner that would affect signal strengths at which the control devices receive the discovery message from a different load control discovery device.

The organized dataset may also be reorganized, e.g., if control devices are associated and/or disassociated with the load control discovery device, and/or if signal strengths at which the control devices receive the discovery message from a different load control discovery device change over time. For example, the organized dataset may be reorganized to account for a device being associated with another load control discovery device, wherein the discovery messages received from an associated load control discovery device has a signal strength that is greater than, or less than, discovery messages from previously associated load control discovery devices. The organized dataset may be reorganized if the same control devices are disassociated from a load control discovery device, e.g., if a load control discovery device is removed from a room or control devices are associated with another load control discovery device.

The organized dataset may be rebuilt. The rebuilt organized dataset may be in addition to, or in place of, pre-existing organized datasets. For example, the organized dataset may be rebuilt if one control device is removed as the load control device, and another control device is assigned as the load control device. The organized dataset may be rebuilt, e.g., to account for the load control device having associations that are different than previous associations.

The discovery range for different types of load control discovery devices may be the same or different. The user 352 may establish the discovery range at the network device 350 or the discovery range may be predefined. If the discovery range is established at the network device 350, the established range may be communicated to the system controller 340, and/or the load control discovery device for being stored thereon.

Any control device (e.g., control-source devices and/or control-target devices) may be identified as the load control discovery device. The control devices may be assigned as the load control discovery device at the system controller 340, at the network device 350, and/or at the control device itself. The load control discovery device may be switched between control devices. For example, the load control discovery device may be switched from the remote control device 330 to one of the lighting control devices of the lighting fixtures 310, 312, 314, 316. The load control discovery device may be switched between control devices via a command from the network device 350. For example, the load control discovery device may be switched between control devices in response to the user selecting one of the control devices on the network device 350. The load control discovery device may be switched between control devices by the user 352 actuating a button (e.g., a button on the occupancy sensor 332) on the respective control device for being assigned as the load control discovery device.

The discovery range may be relative to the load control discovery device, such that identifying different control devices as the load control discovery device may allow for discovery of different devices. As described above, the load control discovery device may switch among control devices (e.g., from a previous load control discovery device to another load control discovery device). As the load control discovery device switches among control devices, the discovery messages may be transmitted within the discovery range of different control devices. For example, if the load control discovery device switches from the remote control device 330 to one of the lighting control devices of the lighting fixtures 310, 312, 314, 316, the center of the discovery range may move from the location of the remote control device to the selected lighting fixture (e.g., in response to a user selection of the control device for being assigned as the load control discovery device on the network device). As the load control discovery device may be a movable device (e.g., remote control device 330, which may be detachable from the wall and carried by the user 352), the discovery range may move with the same load control discovery device.

The discovery message may be sent multiple times. For example, the discovery message may be sent multiple times to identify the control devices located within a moving discovery range and/or to identify control devices that were not previously identified due to interference. The control devices identified as a result of the transmission of multiple messages may be aggregated. The aggregated control devices may be provided to the user 352. For example, the aggregated control devices may be provided to the user 352 via network device 350. Control devices that previously responded to discovery messages may be ignored when responding to subsequent discovery messages. Subsequent discovery messages may identify control devices that previously responded to a discovery message, e.g., to prevent the discovered control devices from having to respond again. If a subsequent response to receipt of a discovery message indicates a different signal strength, the signal strength corresponding to the control device may be updated to the latter signal strength, maintained as the prior signal strength, or the signal strength may be averaged.

There may be more than one load control discovery device. Each load control discovery device may be defined for each group of control devices, such as a group of control devices in a physical space. For example, a control device located in a first portion of a room may be identified as the load control discovery device to discover control devices in the first portion of the room and another control device located in a second portion of the room may be identified as the load control discovery device to discover control devices in the second portion of the room. The control device that is most centrally located in the room, or a portion of a room, may be identified as the load control discovery device.

Digital messages may be sent to the control devices to instruct the control devices to identify themselves and/or corresponding electrical loads, such that the user 352 may identify the control devices for being assigned as the load control discovery device. The identified control devices may be the discovered control devices at a location. The user may actuate a button on the network device 350 to instruct a control device to perform an identification. The identification message may be sent from the system controller 340 to the identified device. The identified control device may receive the identification message and control an electrical load according to control instructions for identifying the device. The system controller 340 may know the type of control device for being identified and may send the control instructions, or the system controller 340 may send a generic identification message that may be detected by the identified device, and the control instructions may be looked up locally.

The user may actuate a button on control devices to assign control devices as the load control discovery device. For example, the user 352 may actuate a button (e.g., for a predetermined period of time) on the remote-control device 330 or the load control discovery device to send a digital message to the system controller 340 to instruct the system controller 340 to identify the remote control device 330 as the load control discovery device. The identification message may be sent from the system controller 340 to the identified control device. The remote control device 330 or the load control discovery device may also, or alternatively, communicate with the control devices directly to request identification. The identified device may receive the identification message and control an electrical load according to control instructions for identifying the device. The system controller 340 may know the type of control device for being identified and may send the control instructions, or the system controller 340 may send a generic identification message that may be detected by the identified device and the control instructions may be looked up locally.

The user 352 may actuate a button (e.g., for a predetermined period of time) on the remote control device 330 or the load control discovery device to identify (e.g., by flashing or otherwise identifying the device) another control device as the load control discovery device or to assign the identified control device as the load control discovery device. This may allow the user 352 to iterate through control devices and select a control device as the load control discovery device. The control devices that are iterated through for being identified as the load control discovery device may be control devices that have been discovered during the discovery mode or other devices (e.g., devices within the discovery range of the remote control device 330 or the load control discovery device).

Different control devices may perform identification differently. The load control devices may increase and/or decrease an amount of power provided to a corresponding electrical load. The lighting control devices in the lighting fixtures 310, 312, 314, 316 may turn on, turn off, raise, lower, or flash the respective lighting loads. A motorized window treatment may raise the level of a covering material up or down, or wiggle with window treatment at the current level. The plug-in load control device 320 may turn on, turn off, raise, lower, or flash the floor lamp 322, or otherwise increase and/or decrease an amount of power. Control devices may also, or alternatively, include an LED that may be turned on, turned off, or flashed for identification.

The system controller 340 may control the lighting control devices (e.g., the lighting control devices in the lighting fixtures 310, 312, 314, 316) to increase and/or decrease the amount of power provided to the respective lighting loads (e.g., to flash the lighting loads) to identify a particular lighting fixture. For example, the system controller 340 may control all of the lighting fixtures in an area or building to full intensity and may cause a particular lighting fixture to periodically decrease its intensity for a short period of time (e.g., flash the particular lighting fixture) to identify the lighting fixture to a user.

Figure 3D:
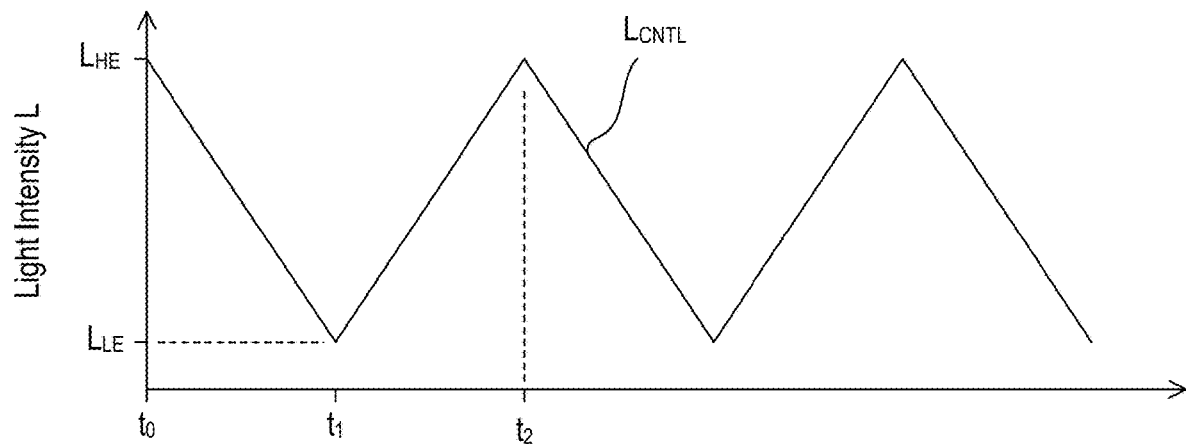
FIGS. 3D and 3E are timing diagrams illustrating a first example flashing profile for use by a lighting control device and/or a control module controlling a lighting control device to identify a particular lighting fixture.

FIG. 3D is a timing diagram of a first example flashing profile for use by a lighting control device (such as lighting control device 364 of fixture 360) and/or a control module controlling a lighting control device (such as control module 376 controlling lighting control device 374 of fixture 370) to identify a particular lighting fixture. A lighting control device and/or control module may cause its respective lighting load to produce such a profile in response to an identification message sent from the system controller 340, for example. As shown in FIG. 3D, the lighting control device and/or control module may periodically adjust a controlled lighting intensity $L_{CNTL}$ of a lighting load between a high-end intensity $L_{HE}$ and a low-end intensity $L_{LE}$. A high-end intensity $L_{HE}$ may be, for example, 100% or an intensity that is substantially 100%, such as 95-100%, and/or an intensity that is perceived by a user to not be a dimmed intensity. For example, the high-end intensity $L_{HE}$ may be the intensity obtained by setting the lighting load to a full-on setting/maximum intensity setting/maximum high intensity setting. A low-end intensity $L_{LE}$ in this example may be 1-10% or an intensity that is approximately 1-10%, such as 1-15% for example. The lighting control device and/or a control module may linearly adjust the controlled lighting intensity $L_{CNTL}$ between the high-end intensity $L_{HE}$ and the low-end intensity $L_{LE}$ as shown in FIG. 3D. The linear adjustment of the intensity between the high-end intensity $L_{HE}$ and the low-end intensity $L_{LE}$ may allow a user to confirm that the lighting control device and/or a control module is dimming correctly (e.g., is wired correctly) during the configuration process of the load control system and/or to also identify a fixture. As shown in FIG. 3D, when the lighting control device and/or control module has decreased the controlled lighting intensity $L_{CNTL}$ to the low-end intensity $L_{LE}$ (e.g., at time $t_1$), the lighting control device and/or a control module may immediately begin to increase the controlled lighting intensity $L_{CNTL}$ towards the high-end intensity $L_{HE}$. Similarly, when the lighting control device and/or control module has increased the controlled lighting intensity $L_{CNTL}$ to the high-end intensity $L_{HE}$ (e.g., at time $t_2$), the lighting control device and/or control module may immediately begin to decrease the controlled lighting intensity $L_{CNTL}$ towards the low-end intensity $L_{LE}$.

Figure 3E:
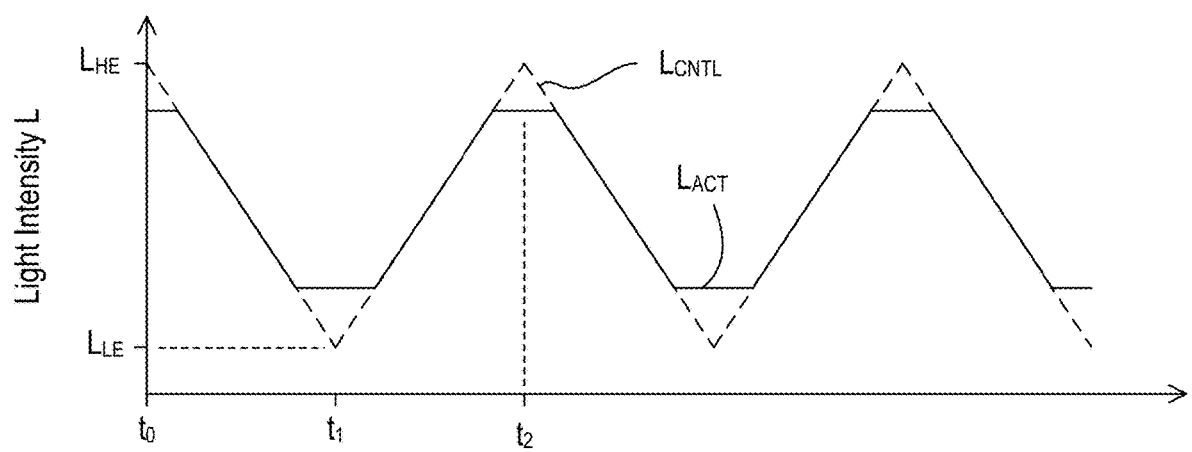

When a control module of a lighting fixture (e.g., the control module 376 of the fixture 370 as shown in FIG. 3C) is attempting to flash the lighting load of the lighting fixture using the flashing profile shown in FIG. 3D, the lighting control device 374 controlled by the control module 376 may be incapable of adjusting the intensity of the lighting load to the intensity defined by the controlled lighting intensity $L_{CNTL}$ shown in FIG. 3D (e.g., due to hardware and/or software limitations of the lighting control device 374). For example, although the control module 376 may instruct the lighting control device 374 to adjust the intensity of the lighting load to the intensity defined by the controlled lighting intensity $L_{CNTL}$ shown in FIG. 3D, the lighting control device 374 may not be able to achieve the high-end intensity $L_{HE}$ and/or the low-end intensity $L_{LE}$ defined by the controlled lighting intensity $L_{CNTL}$. FIG. 3E is a timing diagram illustrating an example actual intensity $L_{ACT}$ that may be generated by a lighting control device 374 when driven with the controlled lighting intensity $L_{CNTL}$ of FIG. 3D (where the controlled lighting intensity $L_{CNTL}$ is shown in dashed lines). If the lighting control device 374 is not able to achieve the high-end intensity $L_{HE}$ and/or the low-end intensity $L_{LE}$ defined by the controlled lighting intensity $L_{CNTL}$, the actual intensity $L_{ACT}$ may be clipped off as shown in FIG. 3E thereby producing a reduced range of intensities. Since the range of intensities between which the actual intensity $L_{ACT}$ varies is smaller than that of the controlled lighting intensity $L_{CNTL}$, the flashing fixture may be more difficult to view than if the intensity was varied across the full range between the high-end intensity $L_{HE}$ and the low-end intensity $L_{LE}$.

Figure 3F:
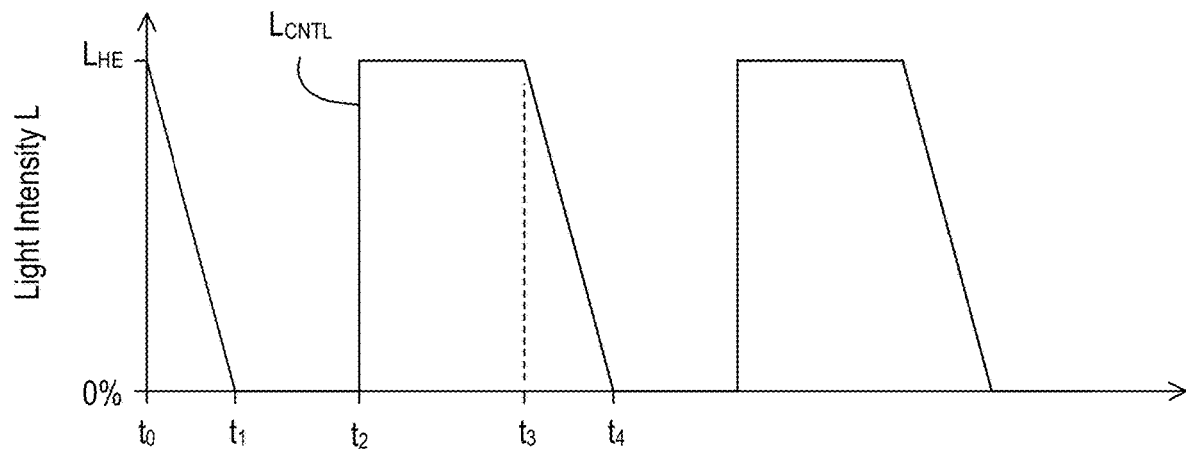
FIGS. 3F and 3G are timing diagrams illustrating a second example flashing profile for use by a lighting control device and/or a control module controlling a lighting control device to identify a particular lighting fixture.
Figure 3G:
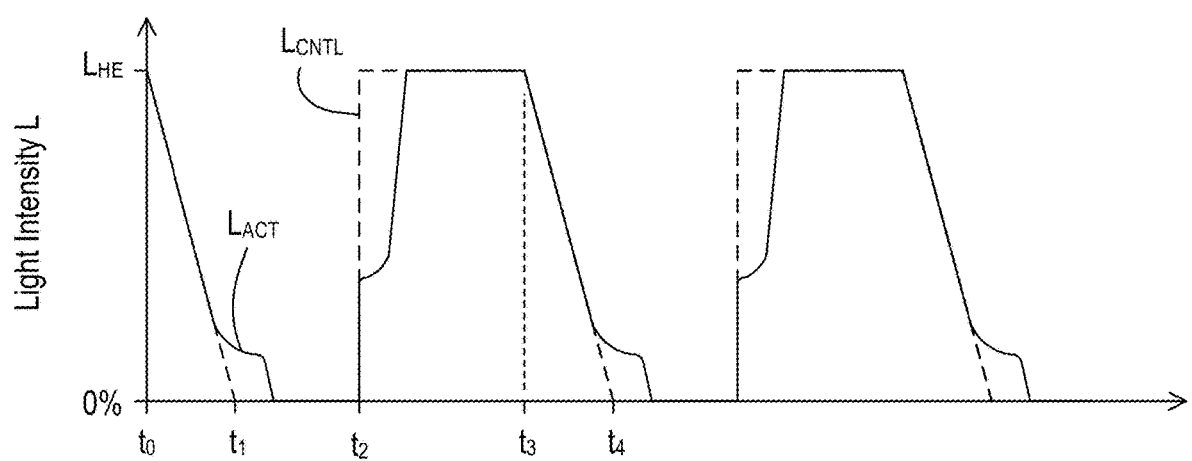

FIG. 3F is a timing diagram of a second example flashing profile $L_{CNTL}$ that may be more noticeable to a user than the flashing profile shown in FIG. 3D. FIG. 3G is a timing diagram illustrating an example actual intensity $L_{ACT}$ generated by a lighting control device (such as lighting control device 364 and/or 374 of fixtures 360 and 370) when driven with the controlled lighting intensity $L_{CNTL}$ of FIG. 3F (where the controlled lighting intensity $L_{CNTL}$ is shown in dashed lines). As shown in FIG. 3F, the lighting control device and/or a control module may periodically adjust a controlled lighting intensity $L_{CNTL}$ between a high-end intensity $L_{HE}$ and off (i.e., 0% intensity). The high-end intensity $L_{HE}$ may be, for example, 100% or an intensity that is substantially 100%, such as 95-100%. For example, the high-end intensity $L_{HE}$ may be the intensity obtained by setting the lighting load to a full-on setting/maximum intensity setting/maximum high intensity setting of the fixture.

Nonetheless, one will recognize that other settings may be used. The lighting control device and/or a control module may be configured to flash a controlled lighting load according to the flashing profile of FIG. 3F during a configuration procedure. The flashing profile $L_{CNTL}$ of FIG. 3F may be characterized by at least one abrupt transition between off and the high-end intensity $L_{HE}$, such as from off to full-on. The flashing profile $L_{CNTL}$ of FIG. 3F may be further characterized by at least one gradual transition between the high-end intensity $L_{HE}$ and off, such as from full-on to off. The abrupt and gradual transitions may be repeated on a periodic basis as shown in FIG. 3F. The gradual transition may occur across a first period of time (e.g., as shown from time $t_0$ to time $t_1$ and from time $t_3$ to time $t_4$) using a predetermined fade rate. This fade rate may be a linear decrease from the high-end intensity $L_{HE}$ to the low-end intensity $L_{LE}$ (although other fade rates such as a non-linear fade rate may be used). For example, the first period of time may be one second, or substantially one second although one will recognize that greater and shorter fade times may be used. The linear adjustment of the intensity from the high-end intensity $L_{HE}$ to off may allow the user to confirm that the lighting control device and/or control module is dimming correctly (e.g., is wired correctly) during the configuration process of the load control system. In some fixtures, such as fixture 370, the actual lighting intensity $L_{ACT}$ may lag behind the controlled lighting intensity $L_{CNTL}$ as the controlled lighting intensity $L_{CNTL}$ is reduced from the high-end intensity $L_{HE}$ to off, and the lighting control device may actually turn off the lighting load after the time $t_1$ or $t_4$ as shown in FIG. 3G. Therefore, the flashing profile $L_{CNTL}$ of FIG. 3F may be further characterized such that when the controlled lighting intensity $L_{CNTL}$ reaches off, the off setting may be maintained for a second period of time (e.g., from time $t_1$ to time $t_2$) to make sure that the lighting load is off before the control module increases the controlled lighting intensity $L_{CNTL}$ (e.g., at time $t_2$) back to the high-end intensity $L_{HE}$. For example, the second period of time may be 1.5 seconds, or substantially 1.5 seconds although longer and shorter times may be used (i.e., the second period of time needs to be long enough to ensure that lighting fixtures that are being controlled have sufficient time to turn off).

As noted above, the flashing profile $L_{CNTL}$ of FIG. 3F may include an abrupt transition of the lighting load from off to the high-end intensity $L_{HE}$. For example, the lighting control device and/or control module may quickly increase the controlled lighting intensity $L_{CNTL}$ from off to the high-end intensity $L_{HE}$ at time $t_2$ (e.g., using a fade rate of zero seconds, or substantially zero-seconds; or making an immediate or substantially immediate transition from off to the high-end intensity). This abrupt setting of the lighting load to the high-end intensity $L_{HE}$ may be more noticeable to a user than gradually turning on the lighting load (e.g., linearly increasing the intensity over a period of time). Some lighting control devices (such as in fixture 370) may not be able to turn on instantly and the actual lighting intensity $L_{ACT}$ may lag behind the controlled lighting intensity $L_{CNTL}$ as shown in FIG. 3G. For example, some lighting control devices may be characterized by a startup time delay. In addition, electronic dimming ballasts must preheat the filaments of a controlled fluorescent lamp and strike the lamp before the lamp is turned on. Therefore, the flashing profile $L_{CNTL}$ of FIG. 3F may be further characterized such that when the controlled lighting intensity reaches the high-end intensity $L_{HE}$, the high-end intensity $L_{HE}$ may be maintained for a third period of time (e.g., from time $t_2$ to time $t_3$) to make sure that the lighting load is at the high-end intensity $L_{HE}$ before the control module begins to decrease the controlled lighting intensity $L_{CNTL}$ (e.g., at time $t_3$) back to off. For example, the third period of time may be two seconds, or substantially two seconds although longer and shorter times may be used (i.e., the third period of time needs to be long enough to ensure that lighting fixtures that are being controlled have sufficient time to reach the high-end intensity $L_{HE}$).

While the flashing profile $L_{CNTL}$ of FIG. 3F includes one transition that is abrupt (e.g., the transition from off to the high-end intensity $L_{HE}$ at time $t_2$), the transition from the high-end intensity to off (e.g., at time $t_0$) may also be abrupt (e.g., using a fade rate of zero seconds, or substantially zero-seconds). In addition, the lighting profile of FIG. 3F may be flipped and characterized by an abrupt transition from the high-end intensity to off (e.g., at time $t_0$) and a gradual (e.g., linear) transition between off to the high-end intensity (e.g., starting or ending at time $t_2$) at a predetermined fade rate.

As discussed above, the lighting control device and/or control module of a lighting fixture (such as fixture 360 or 370) may be pre-programmed with a flashing profile $L_{CNTL}$, such as the profile of FIG. 3F. In response to a message(s) received from the system controller 340, the network device 350, and/or a control source/target device, the lighting control device and/or control module may control the lighting load according to the flashing profile. The lighting control device and/or control module may control the lighting load according to the flashing profile for a defined period of time (periodically changing the light intensity according to the flashing profile) as may be pre-programmed into the lighting control device and/or control module. Alternatively, the received message(s) may indicate how long to maintain the flashing profile. According to another example, the lighting control device and/or control module may maintain the flashing profile until receiving another message from the system controller 340, the network device 350, and/or a control source/target device. According to another example, rather than the lighting control device and/or control module of a lighting fixture (such as fixture 360 or 370) being pre-programmed with a flashing profile $L_{CNTL}$, the profile may be part of a message(s) received from the system controller 340, the network device 350, and/or a control source/target device. In other words, there may be a plurality of flashing profiles that a lighting control device and/or control module may provide and the message(s) may define which profile to provide. Again, such a message(s) may also include an indication as to how long to control the lighting load according to the profile. Alternatively, the lighting control device and/or control module may maintain the profile until receiving another message from the system controller 340, the network device 350, and/or a control source/target device.

After a control device has been identified (e.g., using one of the flashing profiles described above), the user 352 may select the identified device on the network device 350 for identifying the control device as the load control discovery device. The user 352 may identify different control devices as the load control discovery device and discover different devices by moving the established discovery range within a location or to different locations.

Control devices in rooms that are outside of the established discovery range may not receive a discovery message from the load control discovery device. Therefore, the established discovery range may be configurable. For example, the established discovery range may be configurable by adjusting (e.g., incrementally increasing or decreasing) the signal strength (e.g., transmission power) of the load control discovery device, and/or by adjusting (e.g., increasing or decreasing) a threshold value (e.g., the reception power threshold value). The discovery range may be increased (e.g., incrementally increased) as the transmission power of the load control discovery device is increased and/or as the reception power threshold is decreased. As the discovery range is increased, the number of control devices within the discovery range may increase. The discovery range may be adjusted to an adjusted discovery range. Using the established adjusted discovery range, the load control discovery device may discover and/or associate other control devices that come within the adjusted discovery range.

The discovery range may also be adjusted to a larger discovery range that includes more control devices or to a smaller discovery range that may include less control devices. The discovery range may be made smaller to avoid discovering control devices in other locations (e.g., adjacent rooms) when attempting to discover devices in a specific room. The user 352 may adjust the discovery range or move the discovery range to another location depending on the size of the room or the location of various control devices to discover the control devices within a location. When the discovery range is increased, decreased, and/or moved, the display provided on the network device 350 may update accordingly. For example, when the discovery range is moved from one location to another location, the network device 350 may show the control devices in the updated discovery range. In addition, or alternatively, when the discovery range is moved from one location to another location, an aggregation of the control devices from each of the discovery ranges may be identified.

The discovery range may be selected that corresponds to the size of the location. For example, the transmission power of the load control discovery device may be adjusted (e.g., increased or decreased) such that the transmission power of the load control discovery device corresponds to a size of a location. A control device with a greater transmission power may be identified as the load control discovery device, to increase the discovery range in larger rooms. Each location may have a size identifier that indicates the size of each respective location. The transmission power of the load control discovery device may be assigned, or a control device with a corresponding transmission power may be identified as the load control discovery device, to enable the discovery of control devices in a location having the identified size.

The transmission power of the load control discovery device and/or other control devices may be adjusted (e.g., increased or decreased) by a predetermined amount during the discovery mode. The adjusted (e.g., increased and/or decreased) transmission power may be greater than and/or less than the transmission power of the load control discovery device and/or control devices in normal operation. The adjusted transmission power during the discovery mode may enable the control devices and/or load control discovery device to discover more and/or less devices, while preserving the power at the control devices and/or load control discovery device during other usage (e.g., communication of load control messages).

The load control discovery device may communicate with the control devices via one or more intermediary devices. For example, discovery messages may be received at a control device and the acknowledgement and/or signal strength may be communicated via one or more other control devices in the system. The one or more intermediary devices may be used to ensure a greater likelihood that the acknowledgement and/or signal strength are received at the load control discovery device. When the control device is transmitting a discovery message to the load control discovery device (e.g., for a one-way communication device), the signal strengths at which each message is received at an intermediary device may be appended to the messages being communicated. The load control discovery device and/or the system controller 340 may add the signal strengths together to determine the relative distance of the control devices.

A control device may interact with other control devices and/or store information (e.g., location information, signal strength information, device identifiers, as well as other identification information) of the other control devices. For example, control devices may store information about neighboring control devices to enable the control devices to forward information of the neighboring devices. The neighboring control devices may be the control devices from which digital messages are received with a predefined signal strength. Neighboring control devices may be configured by the network device 350 and/or the system controller 340 and may be communicated to control devices for being stored thereon.

A control device may receive a discovery message and store the signal strength related to the received discovery message. The control device may communicate the signal strength at which the discovery message was received to neighboring devices, which may forward the signal strength to other devices, such as the system controller 340. Control devices that receive the discovery message may also, or alternatively, forward the discovery message to neighboring devices, such that control devices outside of the discovery range may still be discovered. The control device may add the signal strength at which a digital message is received from a neighboring device to the signal strength at which the discovery message was received and report the combined signal strength to the system controller 340.

Control devices may be ordered and/or grouped according to respective signal strengths. For example, a control device that determines a signal strength of a received discovery message may determine assumed signal strengths of other control devices, based on the control device's determined signal strength. Neighboring control devices may be assumed to have similar signal strengths. Assumed signal strengths of the control devices may be dependent upon where the control devices for which the signal strengths that are being assumed are located within a predefined distance of the source (e.g., the load control discovery device) of the discovery message. For example, by determining signal strengths of a control device's neighboring control devices, the system controller 340 may directionally calculate the difference between a control device that is −0 dB away from the system controller 340 and a control device that is −50 dB away from the system controller 340 and −20 dB from control devices that were selected as having satisfactory signal strengths.

Existing association information may be discovered by system controller 340 and/or the load control discovery device. The control devices may send association information (e.g., associated device identifiers) that indicates the devices with which the control devices are associated. The association information may be in the discovery messages or in response requests for discovery information. The network device 350 may make a request for a specific control-source device identifier to determine whether a control-target device is associated with a specific control-source device. The control-source device identifier may be provided to the network device for display or an indication may be displayed indicating that the identified control-source device cannot be found.

The system controller 340 may discover one or more control devices within a broadcast control group. A broadcast control group may include one or more control devices of an identified device type, one or more control devices within a defined location, and/or one or more control devices that share another group characteristic. The control devices in a broadcast control group may be controlled at the same time by the system controller 340. The control devices that are included in a broadcast control group may receive a group identifier and store the group identifier such that the control devices included within the broadcast control group may respond to digital messages that are sent to the group and include the group identifier. For example, the system controller 340 may create a lighting control device group that includes the lighting control devices in the lighting fixtures 310, 312, 314, 316. The system controller 340 may instruct the lighting control devices in the lighting fixtures 310, 312, 314, 316 in the lighting control device group to turn on or off, as a group.

Multiple load control discovery devices may be implemented to perform discovery and/or association of control devices. Each of the load control discovery devices may transmit discovery messages to the same devices and/or different devices. The system controller 340 may receive the device identifiers of discovered control devices and/or the signal strength associated with the discovered devices and remove duplicate device identifiers. The system controller 340 may keep the associated signal strength of a device identifier that is the greatest signal strength. The system controller 340 may organize the device identifiers (e.g., in an ascending or descending list by signal strength) after the duplicate device identifiers have been removed, or the system controller 340 may remove the organized device identifiers that have the lower signal strengths.

The system controller 340 may discover when the established discovery range overlaps with the established range of another load control discovery device, for example, when the system controller 340 receives duplicate information from the same device. The system controller 340 may adjust one or more of the discovery ranges to avoid the overlap or may indicate the overlap to the user 352 on the network device 350.

The load control discovery devices may be in communication with one another (e.g., directly in communication with one another or via the system controller 340). The load control discovery device may discover an overlap of established discovery range with the established range of another load control discovery device when the load control discovery device receives a discovery message. The load control discovery device may adjust the discovery range or indicate the overlap to the system controller 340 and/or the network device 350.

As previously mentioned, the control-source devices (e.g., the input devices, such as the remote control device 330, the occupancy sensor 332, and the daylight sensor 334) may be associated with one or more of the control-target devices (e.g., the lighting control devices of the lighting fixtures 310, 312, 314, 316) upon selection of the control devices from a list of discovered control devices that is displayed on the visual display 354 of the network device 350. The control-source devices may be associated with the control-target devices on an area-by-area basis using an area configuration procedure. For example, the area configuration procedure may be repeated for each load control area (such as the load control environment 300 and/or room 302) of a building. Each control-source device located in the area may be associated (e.g., individually associated) with the control-target devices that are to be responsive to the control-source device (e.g., by stepping through each control-source device in the area one-by-one). Each control-source device may be associated with all of the control-target devices in the area or less than all of the control-target devices in the area.

The control-source devices may be associated with the control-target devices of an area in any order. For example, the remote control device 330 may be associated with a subset of the control-target devices, the occupancy sensor 332 may be associated with another subset of the control-target devices, and then the daylight sensor 334 may be associated with another subset of the control-target devices. Or, the daylight sensor 334 may first be associated with a subset of the control-target devices, the remote control device 330 may then be associated with another subset of the control-target devices, and finally the occupancy sensor 332 may be associated with another subset of the control-target devices.

The network device 350 may store the association information of the control-source devices and control-target devices in each area and may transmit the association information to the system controller 340, which may store the association information (e.g., in memory). The system controller 340 and/or the network device 350 may also build and store a control-source device list of the control-source devices in each area and a control-target device list of the control-target devices associated with the control-source devices in each area. The system controller 340 and/or the network device 350 may build the lists of control-source devices and control-target devices as the control-source devices are associated with the control-target devices as part of the area configuration procedure.

Figure 4:
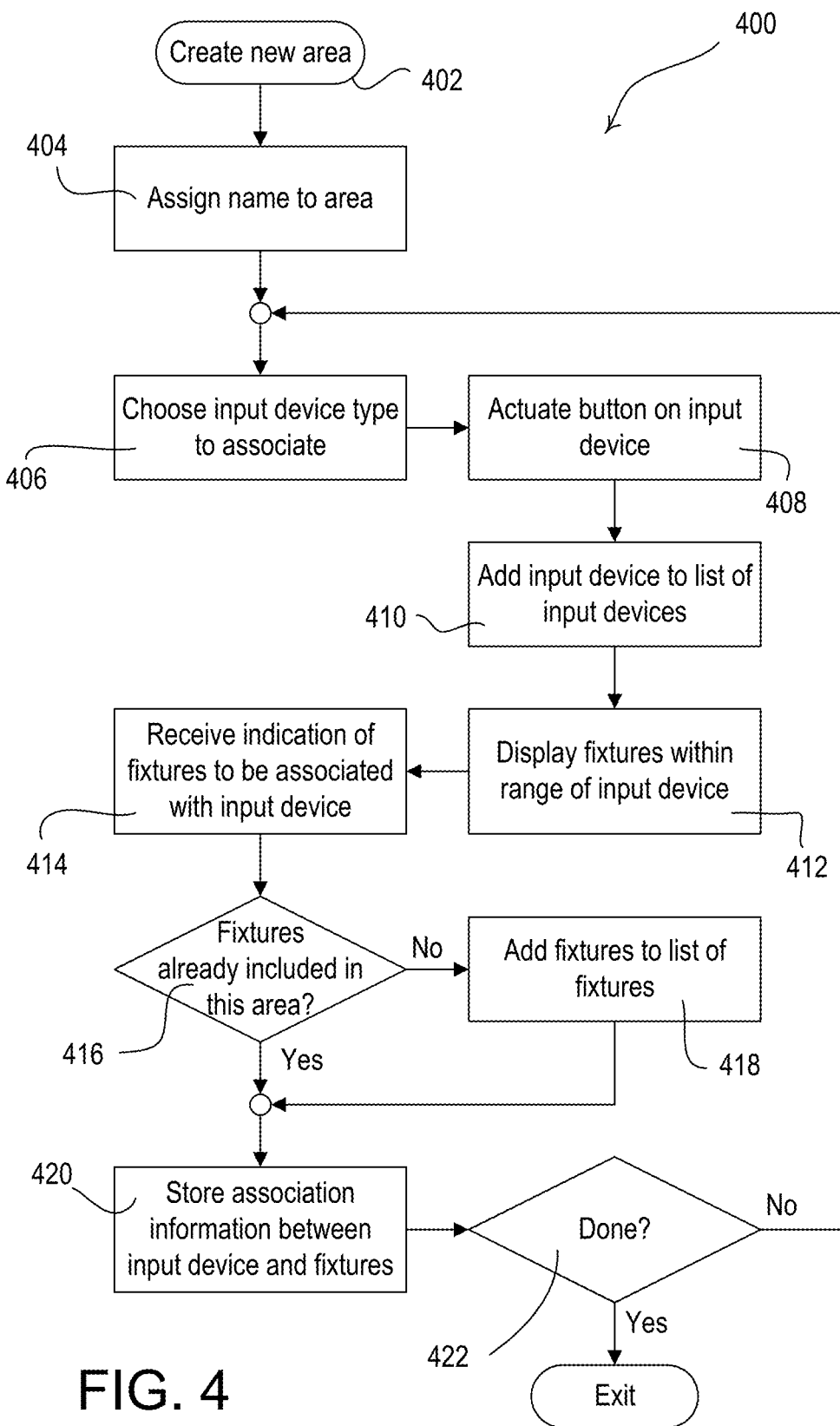
FIG. 4 is a flowchart of an example area configuration procedure for associating control devices in a load control environment.

FIG. 4 is a flowchart of an example area configuration procedure 400 for associating control-source devices with control-target devices in a load control area (such as the load control environment 300 shown in FIG. 3A). FIGS. 5A-5J illustrate example screenshots that may be displayed by a visual display of a network device (e.g., the visual display 354 of the network device 350) during the area configuration procedure 400 (e.g., via a web interface and/or a control application executed by the network device). The area configuration procedure 400 may allow a user (e.g., the user 352) to associate one or more control-source devices (e.g., input devices, such as the remote control device 330, the occupancy sensor 332, and/or the daylight sensor 334) with one or more control-target devices (e.g., the lighting control devices in the lighting fixtures 310, 312, 314, 316) in a specific area. The area configuration procedure 400 may be repeated for different areas of a building.

Figures 5C, 5D:
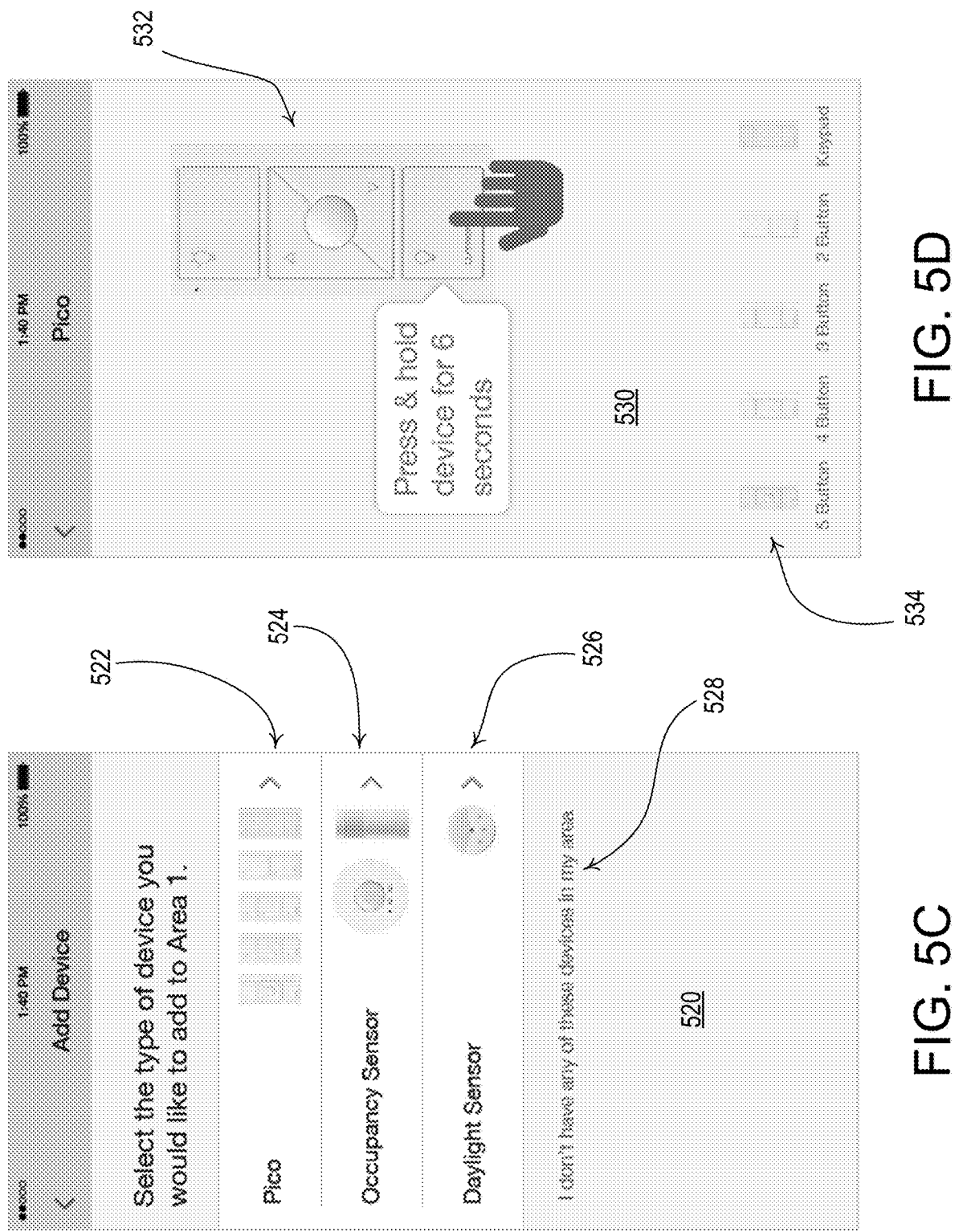

The area configuration procedure 400 may start at 402 when the user selects a "Create an area" option 502 on an area creation screen 500 as shown in FIG. 5A. The user may assign a name (e.g., a unique name) to the area being configured at 404, for example, by entering a name in an area name text field 512 of an area name screen 510 as shown in FIG. 5B. The user may choose the type of control-source device (e.g., the type of input device) displayed on the network device to associate with one or more of the control-target devices (e.g., the lighting control devices of the lighting fixtures) in the area at 406. For example, the network device may display an input device selection screen 520 from which the user may select a remote control device option 522 (e.g., a Pico® remote control device option), an occupant sensor option 524, or a daylight sensor option 526 as shown in FIG. 5C. If the area that is being configured does not have an input device (e.g., does not have a remote control device, an occupancy sensor, or a daylight sensor), the user may select a "no input device" option 528 on the input device selection screen 520.

At 408, the network device may then display a button actuation instruction screen 530 to indicate to the user actuation instructions for enabling discovery. The actuation instruction screen 530 may contain an image 532 instructing the user to actuate a button of the selected input device after which the user may then press and hold the appropriate button of the actual input device located in the area. For example, if the remote control device option 522 is selected at 406, the image 532 of the button actuation instruction screen 530 may be an image of a remote control device (e.g., a 5-button Pico® remote control device) instructing the user to press and hold the bottom button of the remote control device for six seconds as shown in FIG. 5D. An image of the control device may be displayed to assist the user in identification of the proper device. The user may select one or more alternate remote control device options 534 to change the image 532 on the button actuation instruction screen 530 to an image of a remote control device having a different number of buttons and appropriate instructions for that remote control device. In addition, if the occupancy sensor option 524 or the daylight sensor 526 option is selected at 406, the image 532 of the button actuation instruction screen 530 may be an image of an occupancy sensor or a daylight sensor, respectively, with appropriate instructions for actuating a button on each of those sensor devices. If the user selects the "no input device" option 528 on the input device selection screen 520, the network device may display a screen (not shown) instructing the user to actuate a button on one of the control-target devices (e.g., one of the lighting control devices in the lighting fixtures in the area).

Figures 5E, 5F:
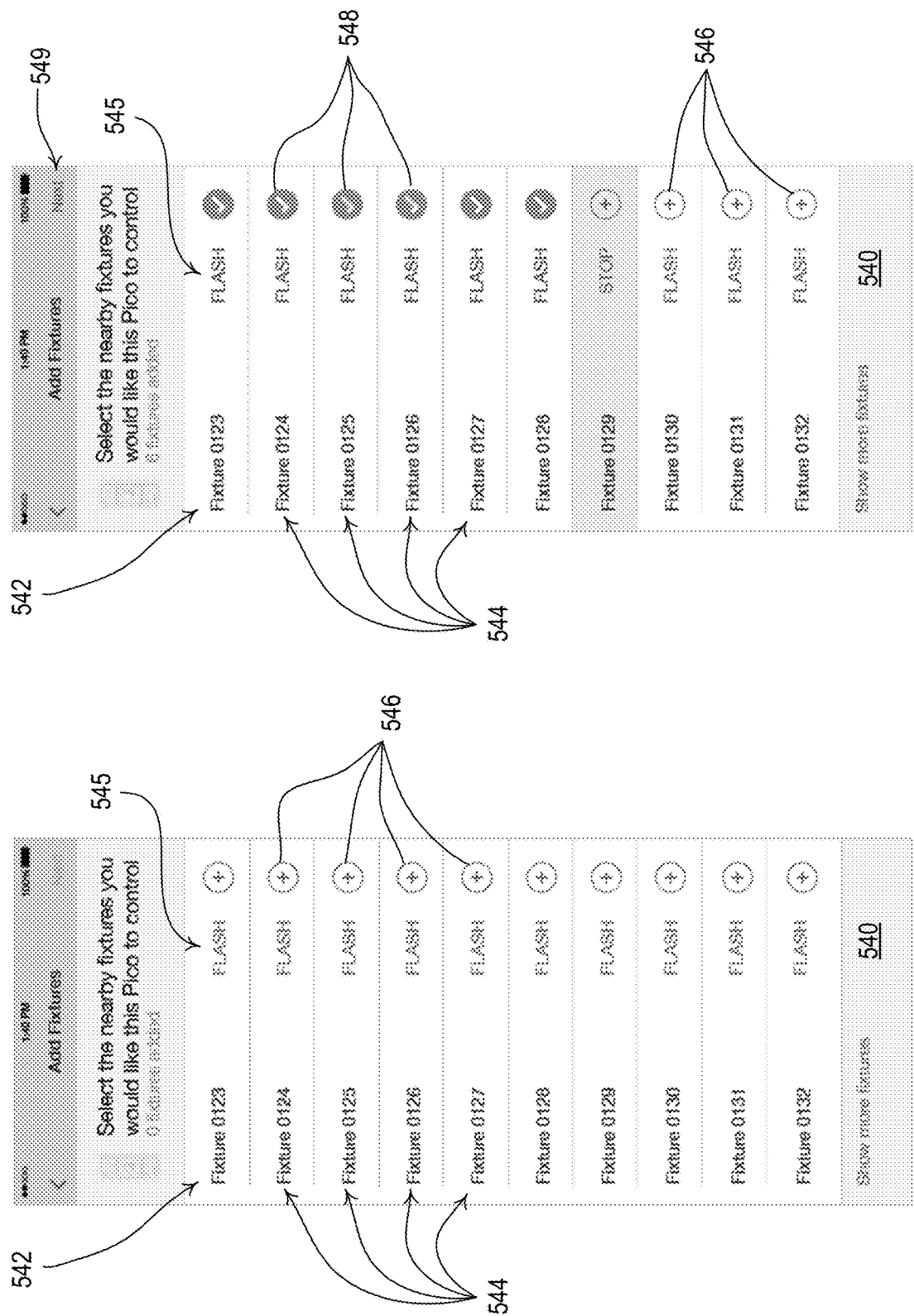

After the button on the input device is actuated appropriately at 408, the network device and/or the system controller may add an input device identifier of the input device to a list of input device identifiers for that area at 410. At 412, the network device may receive and display a list of lighting control devices in lighting fixtures within a discovery range of the input device. The network device may display a fixture identification screen 540 having a list 542 of fixture identifiers 544 as shown in FIG. 5E. For example, the list 542 of fixture identifiers 544 may be displayed in an order determined by decreasing signal strength based on the proximity to the input device on which the button was actuated at 408 (e.g., as described above in greater detail). The fixture identifier 544 of the lighting control device characterized by the highest signal strength may be located at the top of the list 542. The user may identify one of the lighting control devices by selecting the flash option 545 displayed next to the fixture identifier 544 for that lighting control device in the list 544 to cause the lighting control device to flash the lighting load in the lighting fixture. Selection of this option may cause the network device to instruct the system controller to communicate a message(s) to the selected lighting control device. The message may cause the lighting control device to flash a lighting profile, such as the profile of FIG. 3F, as similarly described above. Selection of the option a second time may cause the network device to instruct the system controller to communicate a message(s) to the selected lighting control device to stop flashing the profile. The user may select one or more of the lighting control devices to be associated with the input device by selecting a selection icon 546 displayed next to the fixture identifier 544 for the respective lighting control devices in the list 544. As shown in FIG. 5F, when the user selects one of the selection icons 546 in the list 542, the selection icon may change to a check icon 548 indicated that the lighting control device having that fixture identifier 544 is selected to be associated with the input device. The user may select the flash option 545 to confirm that each lighting control device to be associated with the input device is in the present area (e.g., in the load control environment 300 and/or room 302).

When the user has selected each of the lighting control devices in the lighting fixtures to associate with the input device (on which the button was actuated at 408), the user may select a next option 549 displayed on the fixture identification screen 540 and the network device may receive an indication of the fixture identifiers of the lighting control devices in the lighting fixtures to associate with the input device at 412 of the area configuration procedure 400. If the lighting control devices in the selected lighting fixtures are not already included in the present area at 416, the network device may add the fixture identifiers to a list of fixture identifiers for that area at 418. If the some of the lighting control devices in the selected lighting fixtures are not already included in the present area at 416, but some of the selected lighting control devices are already included in the present area, the lighting control devices that are not included in the present area may be included. The network device may store association information regarding the association between the input device and the lighting control devices in the selected lighting fixtures at step 420. A system controller (e.g., the system controller 340) may also build and store the list of fixture identifiers, the list of input devices, and the association information.

Figure 5H:
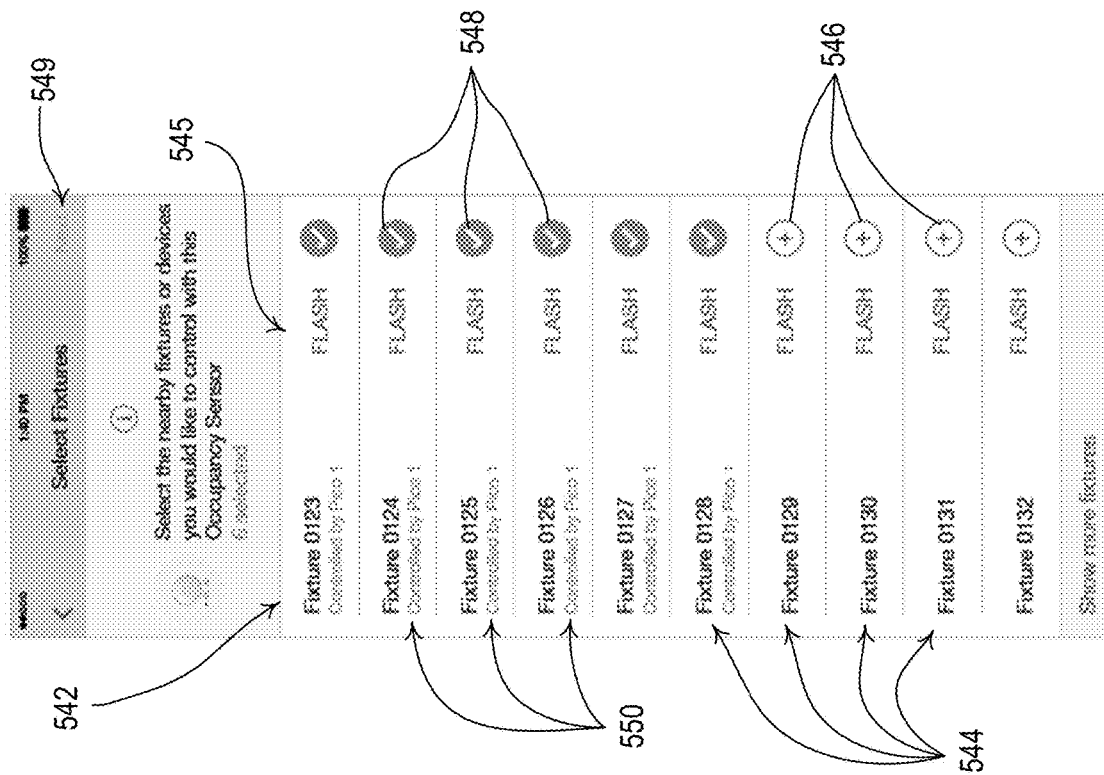
Figure 5G:
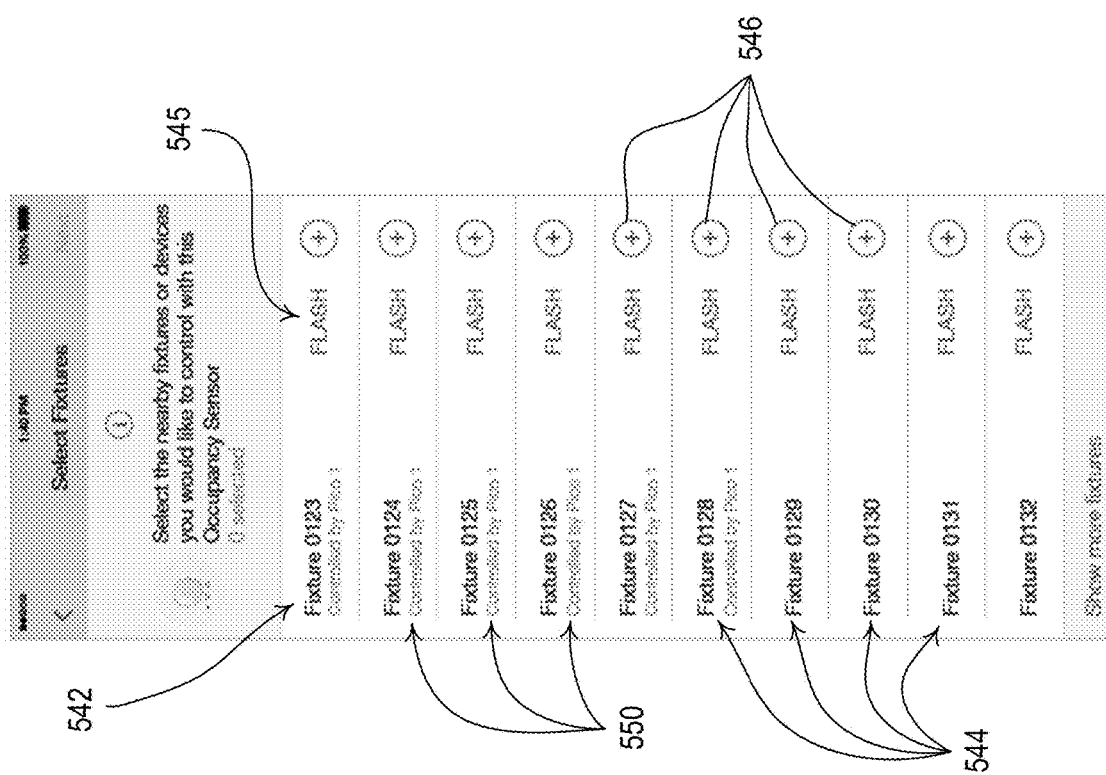

If the area configuration procedure 400 is not complete at 422 (e.g., if there are more input devices to associate with the lighting control devices in the lighting fixtures in the present area), the area configuration procedure 400 may loop around to allow the user to choose another input device to associate with one or more of the control-target devices in the area at 406. For example, the user may actuate a button on an occupancy sensor to associate the occupancy sensor with one or more lighting control devices in lighting fixtures in the area. The network device may receive and display a list (e.g., the list 542) of lighting control devices in lighting fixtures within a discovery range of the occupancy sensor. The network device may include an already-associated indication 550 below the fixture identifiers 544 of the load control devices of those lighting fixtures that were previously associated with an input device as shown in FIG. 5G. For example, the already-associated indication 550 may indicate that the load control devices in those lighting fixtures were previously associated with a remote control device in the area as shown in FIG. 5G. The display of the already-associated indication 550 may help the user identify the fixture identifiers 544 of the load control devices in the lighting fixtures to be associated with the occupancy sensor. For example, the user may wish to associate the occupancy sensor with each of the load control devices in the lighting fixtures that were previously associated with the remote control device and may select the selection icons 546 next to the fixture identifiers 544 having the already-associated indication 550, such that the check icons 548 are displayed as shown in FIG. 5H. This may prevent additional errors or duplicate associations from being generated during the association process.

When the user has completed configuration of the present area at 422, the area configuration procedure 400 may exit.

Figures 5I, 5J:
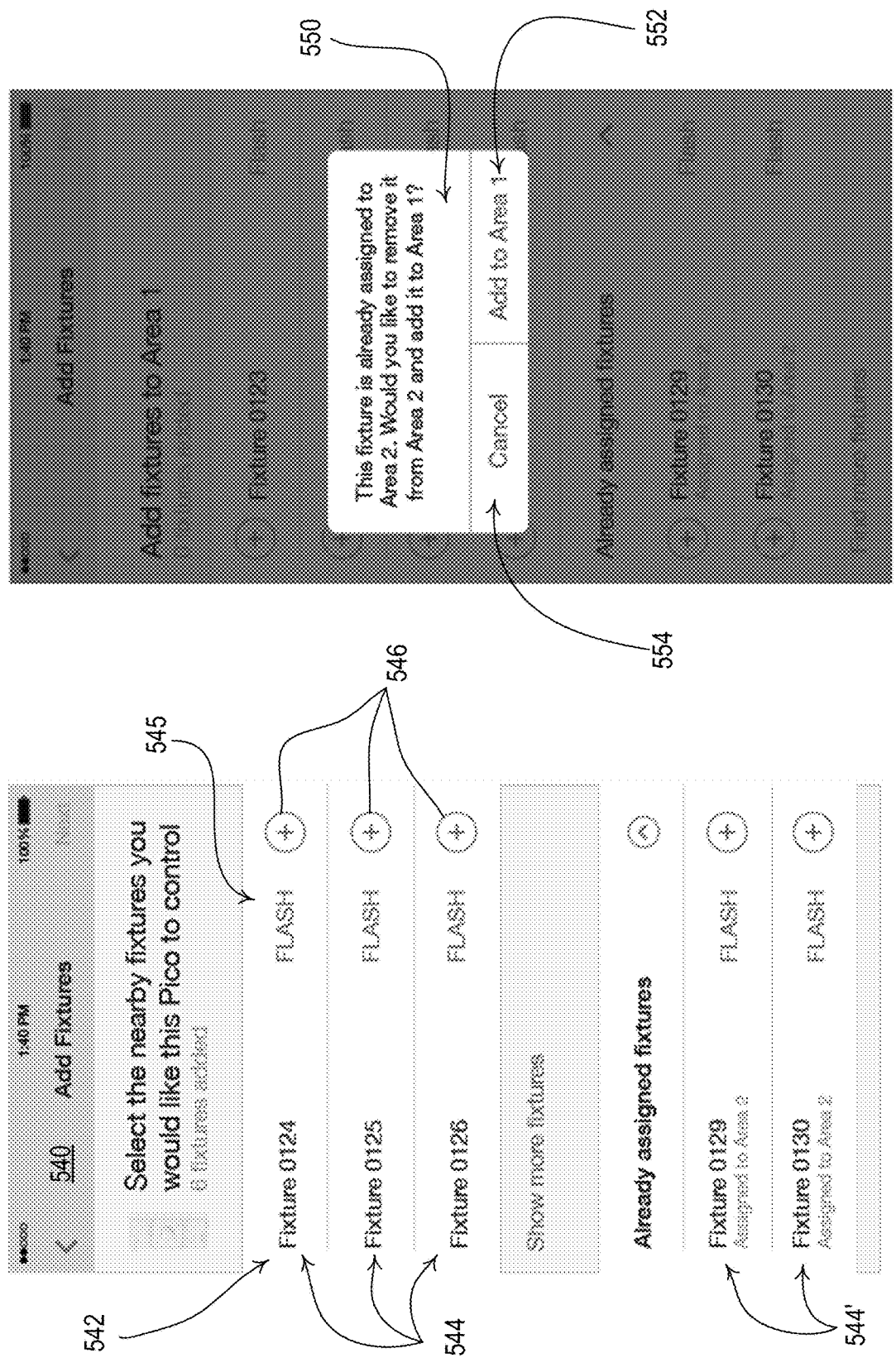

The area configuration procedure 400 may be repeated for different areas of a building. If the user is attempting to associate an input device in an area (e.g., a presently-configured area) that is adjacent to a previously-configured area, the network device may display information regarding load control devices in lighting fixtures in the previously-configured area (e.g., the previously-associated or already-assigned lighting fixtures). For example, the network device may include fixture identifiers 544' of load control devices in previously-associated lighting fixtures in the list 542 on the fixture identification screen 540 as shown in FIG. 5I. The network device may display an alert that the fixture identifiers 544' are already assigned. If the user selects the fixture identifier 544' of a load control device in one of the previously associated lighting fixtures, the network device may display a warning window 550 to allow the user to confirm that the user wants to associate the input device with the load control device in the previously associated lighting fixture as shown in FIG. 5J. If the user selects a confirm option 552 on the warning window 550, the network device may remove the fixture identifier of the load control device in the previously associated lighting fixture from the list of fixture identifiers for the previously-configured area and add the fixture identifier to the list of fixture identifiers for the presently-configured area. If the user selects a cancel option 554 on the warning window 550, the network device may maintain the lists of fixture identifiers for the previously-configured area and the presently-being-configured area.

Figures 6A, 6B:
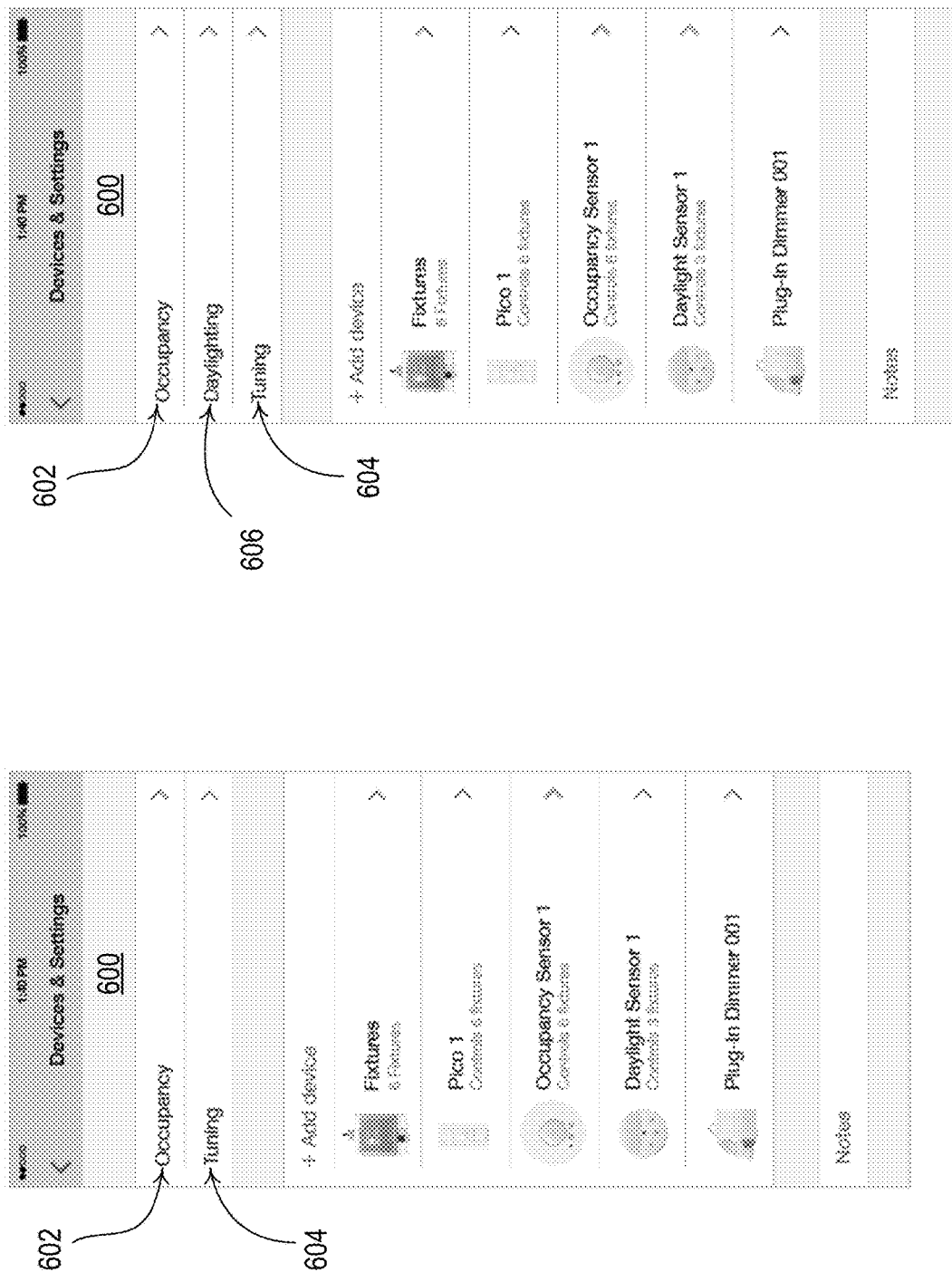
FIGS. 6A and 6B illustrate example screenshots that may be displayed by a visual display of a network device for configuring operational settings of an area.

FIGS. 6A and 6B illustrate example screenshots that may be displayed by a visual display of a network device (e.g., the visual display 354 of the network device 350) for configuring operational settings of an area (e.g., during or after the area configuration procedure 400). The network device may be configured to display a "Device & Settings" screen 600 that displays configuration options (e.g., an area occupancy configuration option 602 and an area tuning configuration option 604) for configuring the area. The configuration options may be displayed on the "Device & Settings" screen 600 depending upon the types of input devices that have been associated with the load control devices in the lighting fixtures in the area. For example, if the at least one remote control device and at least one occupancy sensor have been associated with the load control devices in the lighting fixtures in the area, the area occupancy configuration option 602 and the area tuning configuration option 604 may be displayed on the "Device & Settings" screen 600 as shown in FIG. 6A. If at least one daylight sensor is then associated with the load control devices in the lighting fixtures in the area, an area daylighting configuration option 606 may be displayed on the "Device & Settings" screen 600 as shown in FIG. 6B.

In response to the selection of the area occupancy configuration option 602, the network device may display an area occupancy configuration screen (not shown) that allows for adjustment of the occupancy settings (e.g., sensitivity, timeouts, etc.) for the area. In response to the selection of the area tuning configuration option 604, the network device may display an area tuning configuration screen (not shown) that allows for adjustment of the dimming range settings (e.g., high-end trim, low-end trim, etc.) for the area. In response to the selection of the area daylighting configuration option 606, the network device may display an area daylighting configuration screen (not shown) that allows for adjustment of the daylighting settings (e.g., daylighting gain, etc.) for the area.

Figures 7A, 7B:
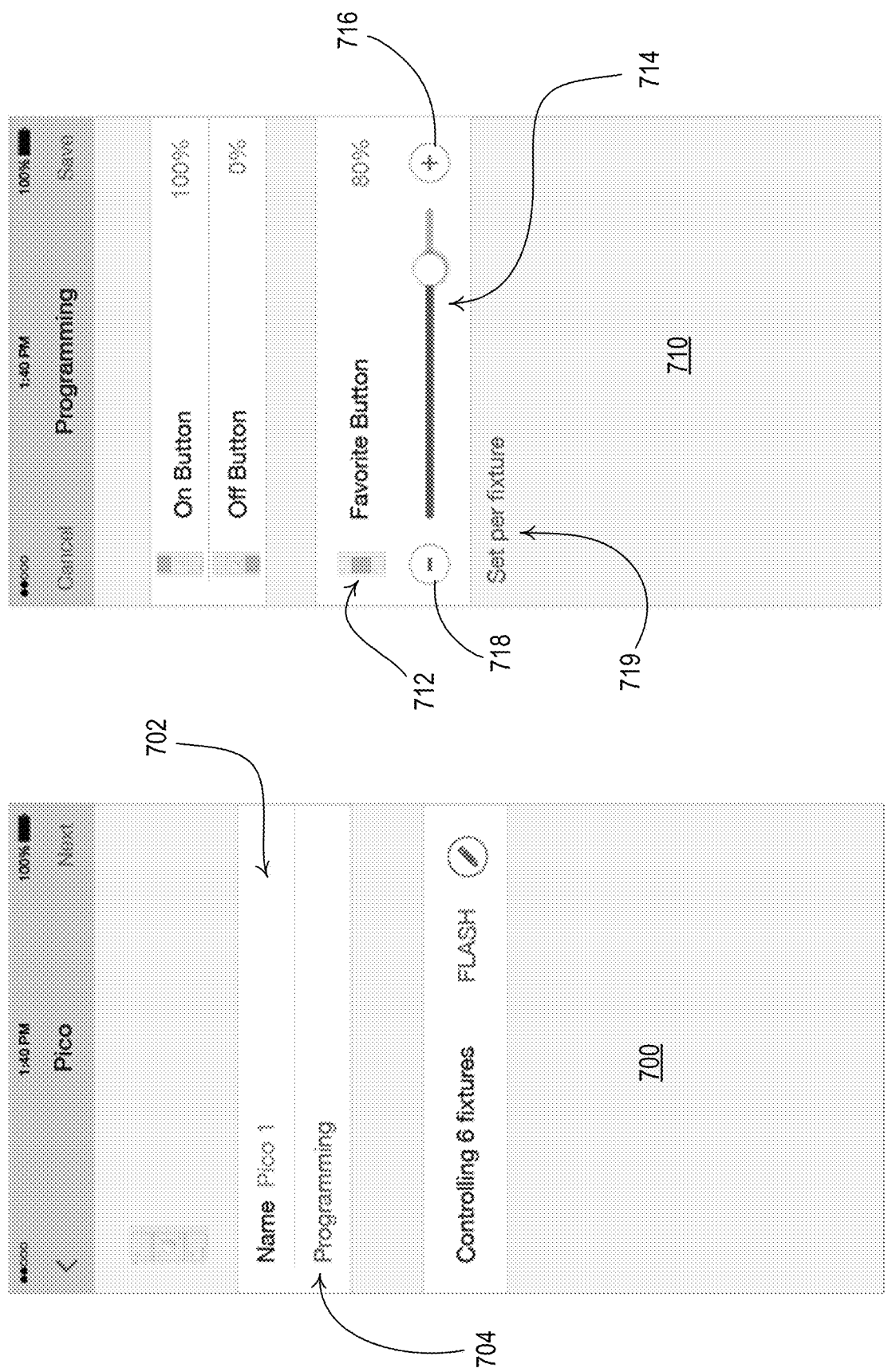
FIGS. 7A-7C illustrate example screenshots that may be displayed by a visual display of a network device for configuring a control device of area.
Figure 7C:
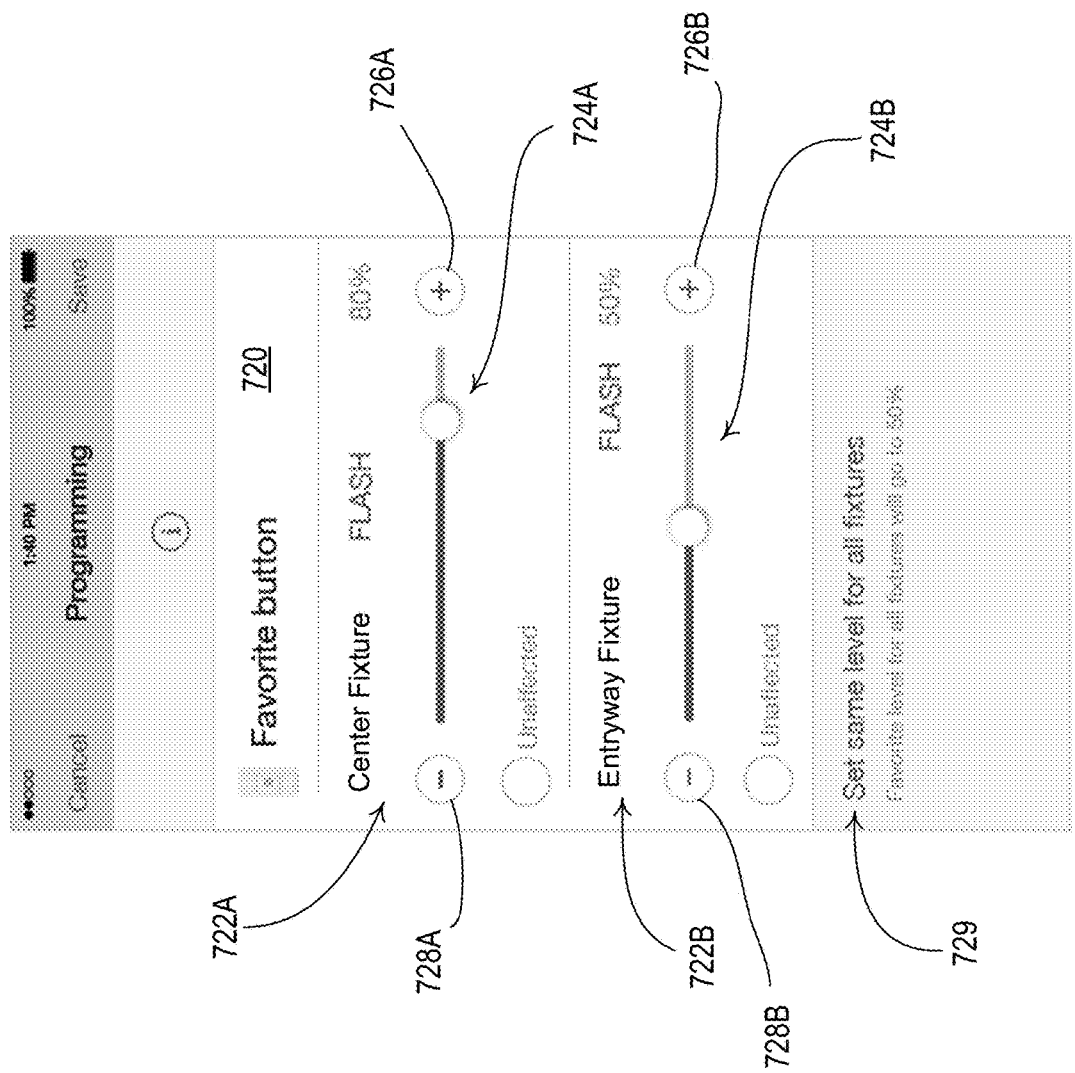

FIGS. 7A-7C illustrate example screenshots that may be displayed by a visual display of a network device (e.g., the visual display 354 of the network device 350) for configuring a control device of area (e.g., during or after the area configuration procedure 400). The network device may be configured to display a control device configuration screen 700 that displays configuration options for configuring a presently-selected control device, for example, a remote control device (such as the remote control device 330) as shown in FIG. 7A. An image of the control device may be displayed to assist the user in identification of the proper device. The user may be able to assign a name to the control device presently being configured, e.g., by entering a name in a control device name text field 702. In addition, the user may be able to program the operation of the control device by selecting a programming option 704.

The network device may display a control device programming screen 710 in response to a selection of the programming option 704. As shown in FIG. 7B, the control device programming screen 710 may display a preset intensity adjustment window 712, which may allow for the adjustment of a preset intensity for the lighting control devices of the lighting fixtures of the area. During normal operation, the lighting control devices may control the intensities of the controlled lighting loads to the preset intensity in response to an actuation of a preset button of the remote control device presently being programmed. The preset intensity adjustment window 712 may include a single slider control 714 for adjusting (e.g., simultaneously adjusting) the preset intensities of each of the lighting control devices of the lighting fixtures in the area (i.e., adjusting the preset intensities of all of the lighting control devices in the area at one time to a single level). The preset intensity adjustment window 712 may include a raise icon 716 for raising the preset intensity by a predetermined amount (e.g., in response to a single actuation of the raise icon), and a lower icon 718 for lowering the preset intensity by a predetermined amount (e.g., in response to a single actuation of the raise icon).

The control device programming screen 710 may also display a "Set per fixture" option 719 to allow for adjustment of the preset intensities of the load control devices of each of the individual lighting fixtures in the area. As shown in FIG. 7C, the network device may display a preset adjustment screen 720 in response to a selection of the "Set per fixture" option 719. The preset adjustment screen 720 may display separate preset intensity adjustment windows 722A, 722B for each of the lighting control devices in the lighting fixtures in the area (e.g., two fixtures as shown in FIG. 7C). Each preset intensity level adjustment window 722A, 722B may include a slider control 724A, 724B for adjusting the preset intensity of the lighting control device of the respective lighting fixture. Each preset intensity adjustment window 722A, 722B may include a raise icon 726A, 726B for raising the preset intensity by a predetermined amount and a lower icon 728A, 728B for lowering the preset intensity by a predetermined amount. In response to an actuation of preset button of the remote control device during normal operation, the lighting control devices may each control the intensity of the controlled lighting load to the respective preset intensity set in the preset adjustment screen 720. The preset adjustment screen 720 may also display a "Set same level for all fixtures" option 729 to provide for returning to the control device programming screen 710 to allow for adjustment of all of the preset intensities of the load control devices of the lighting fixtures in the area in response to the single slider control 714 of the preset intensity adjustment window 712.

Figure 8:
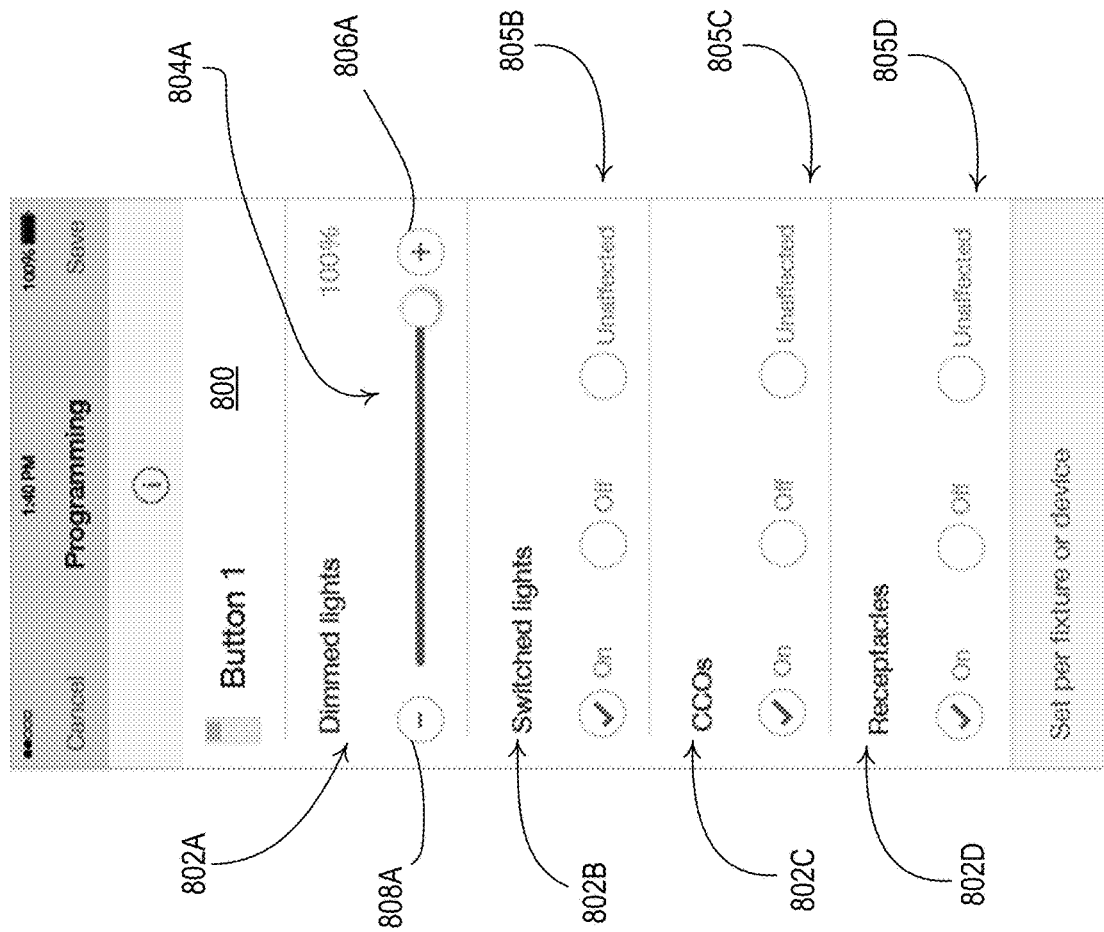
FIG. 8 illustrates another example screenshot displayed by a visual display of a network device for configuring a preset for a button of a control device in an area having more than one type of load control device.

FIG. 8 illustrates another example screenshot that may be displayed by a visual display of a network device (e.g., the visual display 354 of the network device 350) for configuring a preset for a button of a control device in an area having more than one type of load control device. For example, the area may include one or more of the following types of load control devices: lighting control devices of dimmable lighting fixtures (e.g., dimmed lights), lighting control devices of switched lighting fixtures (e.g., switched lights), contact closure output (CCO) devices, and controllable receptacles. The network device may display a preset programming screen 800, which may allow for the adjustment of preset settings for the load control devices of the area. During normal operation, the load control devices may control the controlled electrical loads according the preset settings in response to an actuation of the button of the remote control device that is presently being programmed. The preset programming screen 800 may display multiple preset adjustment windows 802A, 802B, 802C, 802D for each of the different types of load control devices in the area.

As shown in FIG. 8, the preset programming screen 800 may display a dimmed lights preset adjustment window 802A to allow for the adjustment of a preset intensity level for the lighting control devices of the dimmable lighting fixtures of the area. The dimmed lights preset adjustment window 802A may include a slider control 804A for adjusting the preset intensity level of each of the lighting control devices of the dimmable lighting fixtures in the area. The dimmed lights preset adjustment window 802A may include a raise icon 806A for raising the preset intensity level by a predetermined amount and a lower icon 808A for lowering the preset intensity level by a predetermined amount.

The preset programming screen 800 may display a switched lights preset adjustment window 802B for the adjustment of the preset state of the lighting control devices of the switched lighting fixtures, a contact closure output preset adjustment window 802C for the adjustment of the preset state of contact closure output devices, and a receptacle preset adjustment window 802D for the adjustment of the preset state of controlled receptacle devices. The switched lights preset adjustment window 802B, the contact closure output preset adjustment window 802C, and the receptacle preset adjustment window 802D may each display preset state options 805B, 805C, 805D. For example, the display preset state options 805B, 805C, 805D may be on, off, and unaffected as shown in FIG. 8.

Figure 9:
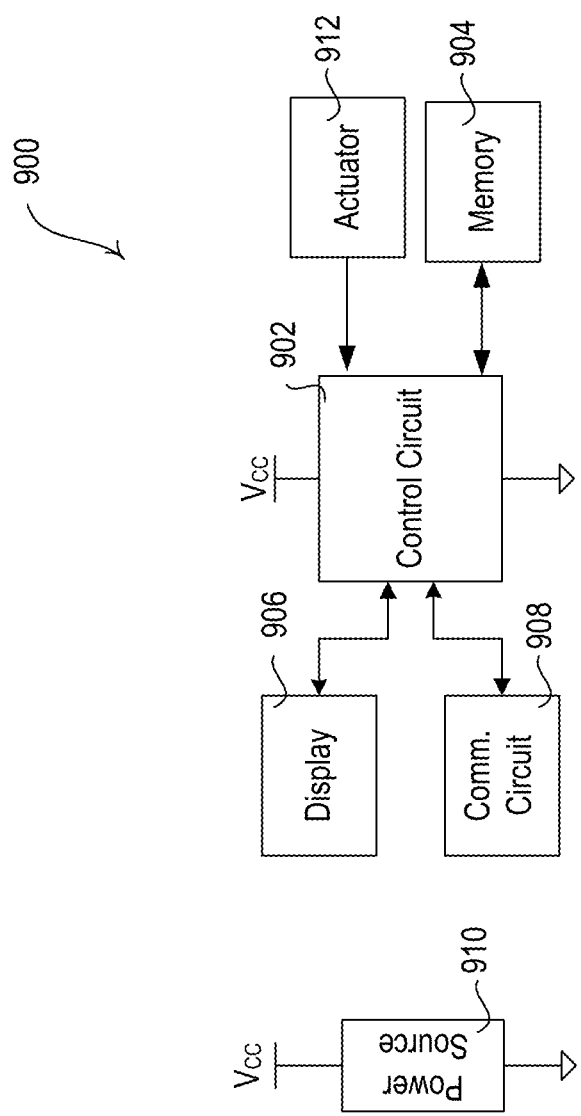
FIG. 9 is a block diagram of an example network device.

FIG. 9 is a block diagram illustrating an example network device 900 as described herein. The network device 900 may include the network device 350, for example. The network device 900 may include a control circuit 902 for controlling the functionality of the network device 900. The control circuit 902 may include one or more general purpose processors, special purpose processors, conventional processors, digital signal processors (DSPs), microprocessors, integrated circuits, a programmable logic device (PLD), application specific integrated circuits (ASICs), or the like. The control circuit 902 may perform signal coding, data processing, power control, input/output processing, or any other functionality that enables the network device 900 to perform as described herein. Instructions (e.g., firmware or/and or software based), that when executed by the control circuit, may configure the control circuit to perform as described herein may be stored in memory 904. In addition, the control circuit 902 may store information in and/or retrieve information from the memory 904. The memory 904 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 900 may include a communications circuit 908 for transmitting and/or receiving information. The communications circuit 908 may perform wireless and/or wired communications. The communications circuit 908 may include an RF transceiver or other circuit capable of performing wireless communications via an antenna. Communications circuit 908 may be in communication with control circuit 902 for transmitting and/or receiving information.

The control circuit 902 may also be in communication with a display 906 for providing information to a user. The processor 902 and/or the display 906 may generate GUIs for being displayed on the network device 900. The display 906 and the control circuit 902 may be in two-way communication, as the display 906 may include a touch screen module capable of receiving information from a user and providing such information to the control circuit 902. The network device may also include an actuator 912 (e.g., one or more buttons) that may be actuated by a user to communicate user selections to the control circuit 902.

Each of the modules within the network device 900 may be powered by a power source 910. The power source 910 may include a power supply or DC power supply, for example. The power source 910 may generate a supply voltage $V_{CC}$ for powering the modules within the network device 900.

Figure 10:
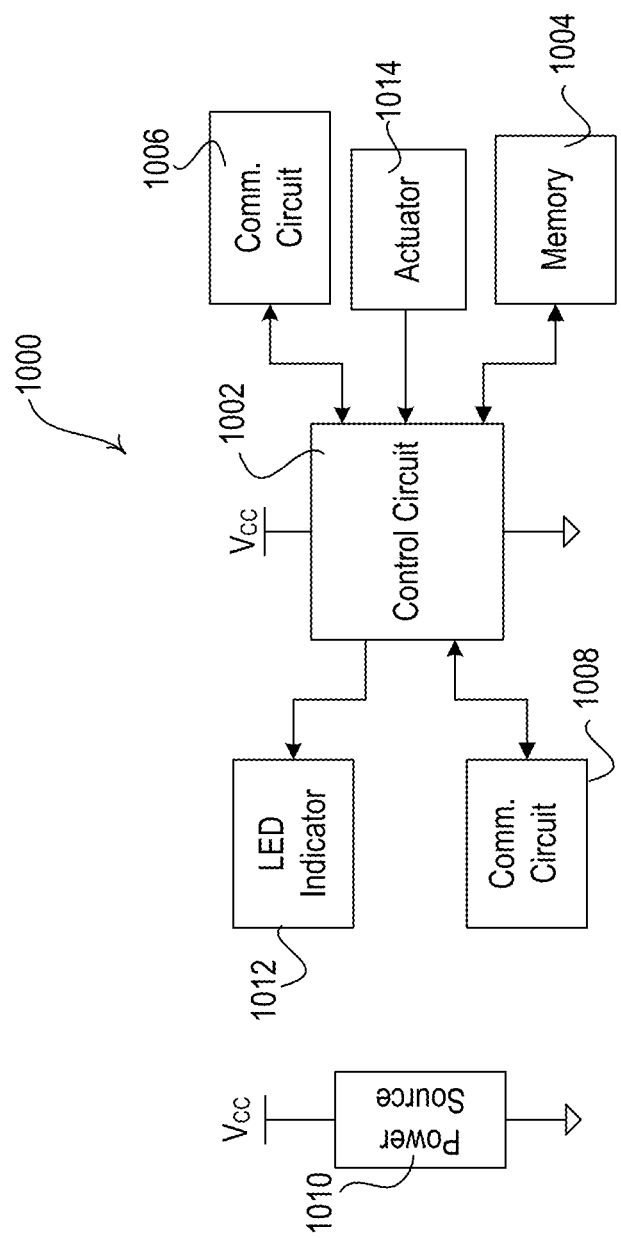
FIG. 10 is a block diagram of an example system controller.

FIG. 10 is a block diagram illustrating an example system controller 1000 as described herein. The system controller 1000 may include a control circuit 1002 for controlling the functionality of the system controller 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), or the like. The control circuit 1002 may perform signal coding, data processing, power control, input/output processing, or any other functionality that enables the system controller 1000 to perform as described herein. Instructions (e.g., firmware or/and or software based), that when executed by the control circuit, may configure the control circuit to perform as described herein may be stored in memory 1004. In addition, the control circuit 1002 may store information in and/or retrieve information from the memory 1004. The memory 1004 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1000 may include a communications circuit 1006 for transmitting and/or receiving information. The communications circuit 1006 may perform wireless and/or wired communications. The system controller 1000 may also, or alternatively, include a communications circuit 1008 for transmitting and/or receiving information. The communications circuit 1006 may perform wireless and/or wired communications. Communications circuits 1006 and 1008 may be in communication with control circuit 1002. The communications circuits 1006 and 1008 may include RF transceivers or other communications modules capable of performing wireless communications via an antenna. The communications circuit 1006 and communications circuit 1008 may be capable of performing communications via the same communication channels or different communication channels. For example, the communications circuit 1006 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 1008 may be capable of communicating (e.g., with control devices and/or other devices in the load control system) via another wireless communication channel (e.g., WI-FI® or a proprietary communication channel, such as CLEAR CONNECT™).

The control circuit 1002 may be in communication with an LED indicator 1012 for providing indications to a user. The control circuit 1002 may be in communication with an actuator 1014 (e.g., one or more buttons) that may be actuated by a user to communicate user selections to the control circuit 1002. For example, the actuator 1014 may be actuated to put the control circuit 1002 in an association mode and/or communicate association messages from the system controller 1000.

Each of the modules within the system controller 1000 may be powered by a power source 1010. The power source 1010 may include a power supply or DC power supply, for example. The power source 1010 may generate a supply voltage $V_{CC}$ for powering the modules within the system controller 1000.

Figure 11:
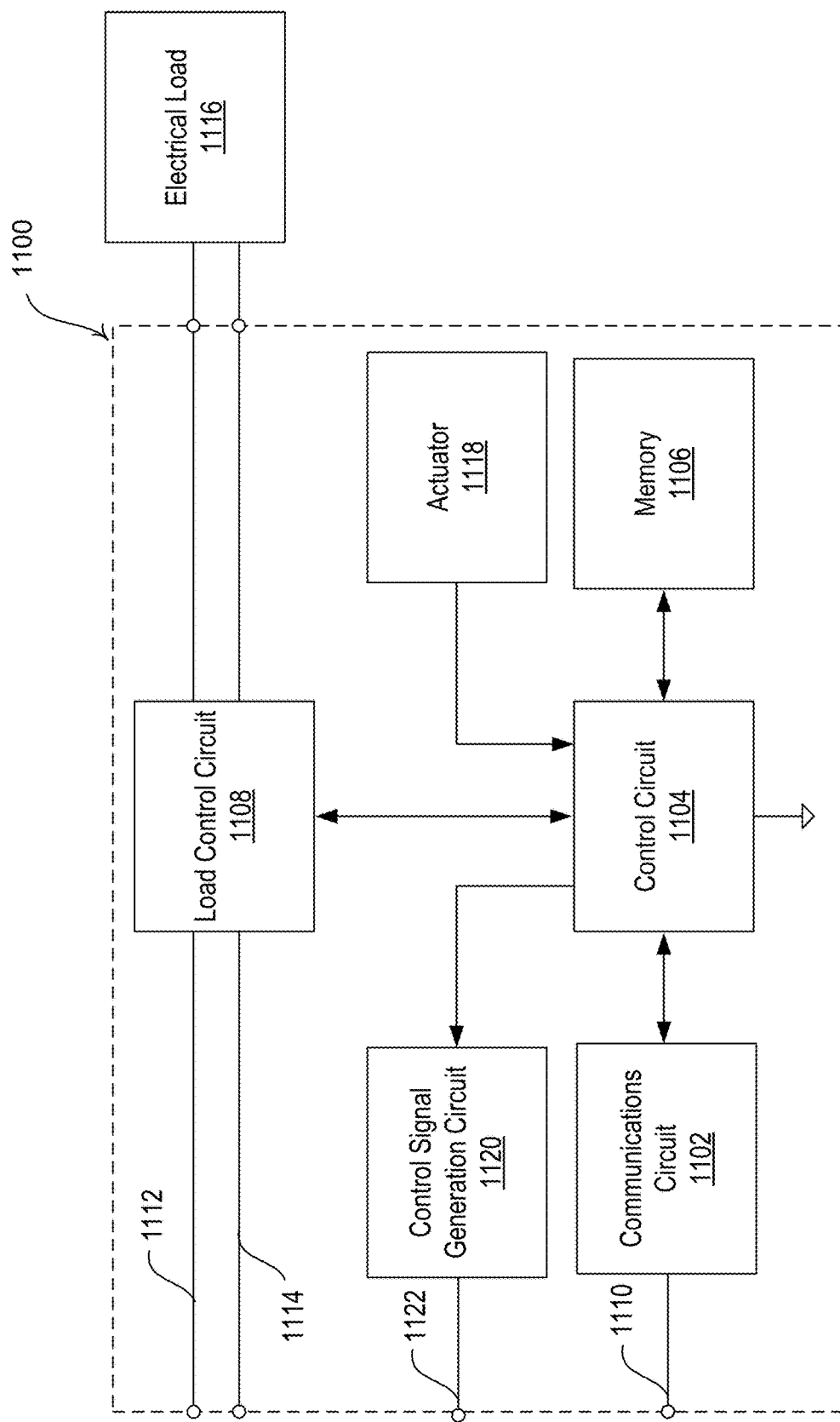
FIG. 11 is a block diagram of an example control-target device.

FIG. 11 is a block diagram illustrating an example control-target device, e.g., a load control device 1100, as described herein. The load control device 1100 may be a dimmer switch, an electronic switch, an electronic ballast for lamps, an LED driver for LED light sources, a plug-in load control device, a temperature control device (e.g., a thermostat), a motor drive unit for a motorized window treatment, or other load control device. The load control device 1100 may include a communications circuit 1102. The communications circuit 1102 may include a receiver, an RF transceiver, or other communications module capable of performing wired and/or wireless communications via communications link (e.g., via a communication link connection 1110). The communications circuit 1102 may be in communication with control circuit 1104. The control circuit 1104 may include one or more general purpose processors, special purpose processors, conventional processors, digital signal processors (DSPs), microprocessors, integrated circuits, a programmable logic device (PLD), application specific integrated circuits (ASICs), or the like. The control circuit 1104 may perform signal coding, data processing, power control, input/output processing, or any other functionality that enables the load control device 1100 to perform as described herein. Instructions (e.g., firmware or/and or software based), that when executed by the control circuit, may configure the control circuit to perform as described herein may be stored in memory 1106.

In addition, the control circuit 1104 may store information in and/or retrieve information from the memory 1106. For example, the memory 1106 may maintain a registry of associated control devices and/or control configuration instructions. The memory 1106 may include a non-removable memory and/or a removable memory. The load control circuit 1108 may receive instructions from the control circuit 1104 and may control the electrical load 1116 based on the received instructions. The load control circuit 1108 may comprise a load regulation circuit configured to turn the electrical load 1116 on and off, and to adjust the amount of power delivered to the electrical load 1116. The load control circuit 1108 may also comprise a switching circuit configured to controllably provide power to the electrical load 1116. The load control circuit 1108 may send status feedback to the control circuit 1104 regarding the status of the electrical load 1116. The load control circuit 1108 may receive power via the hot connection 1112 and the neutral connection 1114 and may provide an amount of power to the electrical load 1116. The electrical load 1116 may include any type of electrical load.

The control circuit 1104 may be in communication with an actuator 1118 (e.g., one or more buttons) that may be actuated by a user to communicate user selections to the control circuit 1104. For example, the actuator 1118 may be actuated to put the control circuit 1104 in an association mode and/or communicate association messages from the load control device 1100.

The load control device 1100 may further include a control signal generation circuit 1120 configured to generate a control signal for controlling an external load control device (e.g., an external lighting control device, such LED driver or a ballast, located in the same lighting fixture as the load control device 1100). The control signal generation circuit 1120 may be coupled to the external lighting control device via a control wiring (e.g., the control wiring 379 shown in FIG. 3C). The control signal generation circuit 1120 may be coupled to the control wiring via a control wiring connection 1122. The control circuit 1104 may be in communication with the control signal generation circuit 1120 and may be configured to cause the control signal generation circuit 1122 to generate the control signal on the control wiring. The control signal generated by the control signal generation circuit 1120 may comprise, for example, an analog control signal, a 0-10V control signal, a pulse-width modulated (PWM) control signal, a phase-control signal, a digital message transmitted via a standard protocol, or another type of control signal).

FIG. 12 is a block diagram illustrating an example control-source device 1200 as described herein. The control-source device 1200 may be a remote control device, an occupancy sensor, a daylight sensor, a window sensor, a temperature sensor, and/or the like. The control-source device 1200 may include a control circuit 1202 for controlling the functionality of the control-source device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), or the like. The control circuit 1202 may perform signal coding, data processing, power control, input/output processing, or any other functionality that enables the control-source device 1200 to perform as described herein. Instructions (e.g., firmware or/and or software based), that when executed by the control circuit, may configure the control circuit to perform as described herein may be stored in memory 1204.

In addition, the control circuit 1202 may store information in and/or retrieve information from the memory 1204. The memory 1204 may include a non-removable memory and/or a removable memory, as described herein.

The control-source device 1200 may include a communications circuit 1208 for transmitting and/or receiving information. The communications circuit 1208 may transmit and/or receive information via wired and/or wireless communications. The communications circuit 1208 may include a transmitter, an RF transceiver, or other circuit capable of performing wired and/or wireless communications. The communications circuit 1208 may be in communication with control circuit 1202 for transmitting and/or receiving information.

The control circuit 1202 may also be in communication with an input circuit 1206. The input circuit 1206 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1206 to put the control circuit 1202 in an association mode and/or communicate association messages from the control-source device. The control circuit 1202 may receive information from the input circuit 1206 (e.g., an indication that a button has been actuated or sensed information). Each of the modules within the network device 1200 may be powered by a power source 1210.

In addition to what has been described herein, the methods and systems may also be implemented in a computer program(s), software, or firmware incorporated in one or more computer-readable media for execution by a control circuit(s), a computer(s), and/or a processor(s), for example. Examples of computer-readable media include electronic signals (transmitted over wired or wireless connections) and tangible/non-transitory computer-readable storage media. Examples of tangible/non-transitory computer-readable storage media include, but are not limited to, read only memory (ROM), random-access memory (RAM), removable disks, optical media such as CD-ROM disks and digital versatile disks (DVDs), subscriber identity module (SIM) cards, memory sticks, memory cards, etc.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A control module for controlling a lighting control device configured to adjust an amount of power delivered to a lighting load, the control module comprising:
   a control signal generation circuit configured to provide a control signal to the lighting control device; and
   a control circuit configured to control the lighting control device via the control signal generation circuit to control the amount of power delivered to the lighting load to adjust an intensity of the lighting load, the control circuit further configured to cause the lighting load to flash by:
   controlling the control signal provided to the lighting control device to control the lighting load to a controlled intensity;
   decreasing the controlled intensity from a high-end intensity to off across a first period of time;
   after the controlled intensity has been decreased from the high-end intensity to off, maintaining the controlled intensity at off for a second period of time;
   after the second period of time, abruptly increasing the controlled intensity from off to the high-end intensity;
   after the controlled intensity has been increased from off to the high-end intensity, maintaining the controlled intensity at the high-end intensity for a third period of time; and
   periodically repeating the steps of decreasing, maintaining, increasing, and maintaining.

2. The control module of claim 1, wherein the control circuit is configured to cause the lighting load to flash according to a flashing profile.

3. The control module of claim 2, further comprising:
   a communications circuit in communication with the control circuit and configured to receive a message;
   wherein the control circuit is configured to cause the lighting load to flash according to the flashing profile in response to the message received via the communications circuit.

4. The control module of claim 3, wherein the control circuit is configured to maintain the flashing profile until a subsequent message is received via the communications circuit.

5. The control module of claim 3, wherein the message indicates how long to maintain the flashing profile.

6. The control module of claim 3, wherein the control circuit is configured to determine one of a number of flashing profiles to provide in response to the message received via the communications circuit.

7. The control module of claim 2, wherein the load control device is pre-programmed with the flashing profile.

8. The control module of claim 1, wherein the first period of time is substantially one second, the second period of time is substantially 1.5 seconds, and the third period of time is substantially two seconds.

9. The control module of claim 8, wherein abruptly increasing the controlled intensity from off to the high-end intensity comprises increasing the controlled intensity from off to the high-end intensity using a fade rate of substantially zero seconds.

10. The control module of claim 1, wherein the high-end intensity comprises a full-on setting.

11. A control module for controlling a lighting control device configured to adjust an amount of power delivered to a lighting load, the control module comprising:
    a control signal generation circuit configured to provide a control signal to the lighting control device; and
    a control circuit configured to control the lighting control device via the control signal generation circuit to control the amount of power delivered to the lighting load to adjust an intensity of the lighting load, the control circuit configured to cause the lighting load to flash according to a flashing profile;
    wherein the flashing profile is characterized by at least one abrupt transition between off and a high-end intensity, and at least one gradual transition between off and the high-end intensity, the abrupt and gradual transitions repeated on a periodic basis.

12. The control module device of claim 11, wherein the control circuit is configured to generate a controlled intensity for controlling the lighting load, the control circuit configured to abruptly increase the controlled intensity from off to the high-end intensity to generate the abrupt transition in the flashing profile.

13. The control module of claim 12, wherein the control circuit is configured to decrease the controlled intensity from the high-end intensity to off across a first period of time to generate the gradual transition in the flashing profile.

14. The control module of claim 13, wherein the control circuit is configured to maintain the controlled intensity at off for a second period of time after the controlled intensity has been decreased from the high-end intensity to off and before the controlled intensity is increased from off to the high-end intensity, the control circuit further configured to maintain the controlled intensity at the high-end intensity for a third period of time after the controlled intensity has been increased from off to the high-end intensity.

15. The control module of claim 14, wherein the first period of time is substantially one second, the second period of time is substantially 1.5 seconds, and the third period of time is substantially two seconds.

16. The control module of claim 15, wherein the control circuit is configured to abruptly increase the controlled intensity from off to the high-end intensity using a fade rate of substantially zero seconds.

17. The control module of claim 12, wherein the control circuit is configured to abruptly increase the controlled intensity from off to the high-end intensity using a fade rate of substantially zero seconds.

18. The control module of claim 11, further comprising:
   a communications circuit in communication with the control circuit and configured to receive a message;
   wherein the control circuit is configured to cause the lighting load to flash according to the flashing profile in response to the message received via the communications circuit.

19. The control module of claim 11, wherein the control module is pre-programmed with the flashing profile.

20. The control module of claim 11, wherein the high-end intensity comprises a full-on setting.

* * * * *